(12) United States Patent
Yu

(10) Patent No.: US 12,038,850 B1
(45) Date of Patent: Jul. 16, 2024

(54) PROCESSING DEVICE AND METHOD OF UPDATING TRANSLATION LOOKASIDE BUFFER THEREOF

(71) Applicant: Rebellions Inc., Seongnam-si (KR)

(72) Inventor: Chang-Hyo Yu, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/500,781

(22) Filed: Nov. 2, 2023

(30) Foreign Application Priority Data

Dec. 27, 2022 (KR) ........................ 10-2022-0186294

(51) Int. Cl.
*G06F 12/1027* (2016.01)
*G06N 3/04* (2023.01)
*G06N 3/08* (2023.01)

(52) U.S. Cl.
CPC ........... *G06F 12/1027* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2015/0058592 A1* | 2/2015 | Bhattacharjee | G06F 12/1027 711/205 |
| 2016/0140048 A1 | 5/2016 | Mukherjee et al. | |
| 2018/0150322 A1* | 5/2018 | Dunham | G06F 9/4843 |
| 2020/0065424 A1* | 2/2020 | Ananthapur Bache | G06N 3/08 |
| 2020/0293457 A1* | 9/2020 | Vougioukas | G06F 12/1036 |
| 2020/0379809 A1* | 12/2020 | Yudanov | G06N 3/045 |
| 2021/0055977 A1* | 2/2021 | Lisuk | G06F 9/547 |
| 2021/0303156 A1* | 9/2021 | Kachare | G06F 3/0673 |
| 2022/0222767 A1* | 7/2022 | Ray | G06F 12/0842 |
| 2022/0357888 A1* | 11/2022 | Ballapuram | G06F 3/0659 |
| 2023/0026006 A1* | 1/2023 | Li | G06N 3/04 |
| 2023/0080578 A1* | 3/2023 | Symes | G06N 3/0464 708/620 |
| 2023/0229730 A1* | 7/2023 | Mansell | G06F 5/01 708/209 |
| 2023/0281129 A1* | 9/2023 | Iizawa | G06F 12/0877 711/118 |
| 2023/0333999 A1* | 10/2023 | Omer | G06F 13/28 |

FOREIGN PATENT DOCUMENTS

KR 10-2258566 B1 6/2021

OTHER PUBLICATIONS

"How is a page walk implemented?", Quora. Link: https://www.quora.com/How-is-a-page-walk-implemented.

* cited by examiner

*Primary Examiner* — Stephanie Wu
(74) *Attorney, Agent, or Firm* — BROADVIEW IP LAW, PC

(57) ABSTRACT

A neural processing device and a method of updating translation lookaside buffer thereof are provided. The neural processing device includes at least one processor module each of which includes at least one micro translation lookaside buffer (TLB), a hierarchical memory that is accessed by the at least one micro TLB, and a command processor configured to update the at least one micro TLB in a push mode by generating a first update signal which indicates update of the at least one micro TLB and transmitting the first update signal to the at least one micro TLB.

21 Claims, 40 Drawing Sheets

PROCESSING DEVICE AND METHOD OF UPDATING TRANSLATION LOOKASIDE BUFFER THEREOF

CROSS-REFERENCE TO RELATED APPLICATION

This application claims priority under 35 U.S.C § 119 to Korean Patent Application No. 10-2022-0186294, filed on Dec. 27, 2022, in the Korean Intellectual Property Office, the entire contents of which is hereby incorporated by reference.

TECHNICAL FIELD

The disclosure relates to a processing device and a method of updating translation lookaside buffer (TLB) of the processing device. Specifically, the disclosure relates to a processing device that updates a TLB not only in a pull mode but also in a push mode and a method of updating the TLB of the processing device.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology to realize a level of human learning ability, reasoning ability, perceptual ability, natural language implementation ability, etc., it is of utmost important to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

These neural processing unit have a plurality of computation devices therein, and each computation device operates in parallel and thereby enhance computation efficiency. In some embodiments, there is a page entry for translating a virtual address of each computation devices and a memory into a physical address, and a method of updating translation lookaside buffer (TLB) for quickly translating the virtual address into the physical address operates in a pull mode in which update is performed when TLB miss occurs.

The description set forth in the background section should not be assumed to be prior art merely because it is set forth in the background section. The background section may describe aspects or embodiments of the disclosure.

SUMMARY

Aspects of the disclosure provide a neural processing device that updates a translation lookaside buffer (TLB) operating not only in a pull mode but also in a push mode.

Aspect of the disclosure provide a task management method of a neural processing device that updates a TLB operating not only in a pull mode but also in a push mode.

According to some aspects of the disclosure, a neural processing device includes at least one processor module each of which includes at least one micro translation lookaside buffer (TLB), a hierarchical memory that is accessed by the at least one micro TLB, and a command processor configured to update the at least one micro TLB in a push mode by generating a first update signal which indicates update of the at least one micro TLB and transmitting the first update signal to the at least one micro TLB.

According to some aspects, the neural processing device further includes a neural core system on chip (SoC) including the at least one processor module, the hierarchical memory, and the command processor, and a central processing unit (CPU) outside the neural core SoC, wherein the at least on micro TLB is updated by receiving a second update signal that is different from the first update signal and instructs to update the micro TLB, and the second update signal is generated by the CPU.

According to some aspects, the first update signal is generated according to whether a first criterion according to characteristics of a workload assigned to the at least one processor module is satisfied.

According to some aspects, the first criterion is at least one of whether the workload assigned to the at least one processor module is a workload for a next layer of a neural network model, whether the workload assigned to the at least one processor module is a workload for a front layer of the neural network model, or whether the workload assigned to the at least one processor module is a workload for a single stream inference.

According to some aspects, the first update signal is generated according to whether a second criterion according to a type of the hierarchical memory to be accessed by the at least one processor module is satisfied.

According to some aspects, the second criterion is at least one of whether the hierarchical memory to be accessed by the at least one processor module is an on-chip memory, or whether the hierarchical memory to be accessed by the at least one processor module is a memory for peer to peer (P2P) data access beyond a chip boundary of the neural processing device.

According to some aspects, the first update signal is generated according to whether a third criterion according to a type of a buffer region of the hierarchical memory to be accessed by the at least one processor module is satisfied.

According to some aspects, the third criterion is at least one of whether the buffer region to be accessed by the at least one processor module is a read-only sharable memory region, whether the buffer region to be accessed by the at least one processor module is a buffer region of a backed register file, whether the buffer region to be accessed by the at least one processor module is a partial region for register spilling, whether the buffer region to be accessed by the at least one processor module is a region whose size is less than a threshold size and which is accessed more frequently than a threshold frequency, whether the buffer region to be accessed by the at least one processor module is a buffer region for a command descriptor, or whether the buffer region to be accessed by the at least one processor module is a region for an optional memory mapped file.

According to some aspects, the first update signal is in a form of a descriptor or in a form of an instruction.

According to some aspects, the command processor includes a first memory management unit configured to generate the first update signal.

According to some aspects, the neural processing device further includes a second memory management unit configured to generate the first update signal and disposed outside the command processor.

According to some aspects, the processor module includes at least one of L1 load/store unit (LSU) configured to perform load and store of data, a micro direct memory access (DMA) configured to control access to the hierarchical memory of the processor module, a task manager configured to receive a task descriptor from the command processor and manage an operation of the processor module, or a DMA configured to control access to the hierarchical memory of a neural processor including the L1 LSU, the micro DMA, and the task manager.

According to some aspects, the at least one micro TLB performs a page walk when TLB miss occurs, and performs TLB update in a pull mode through the page walk.

According to some aspects, the at least one micro TLB is set in one of the pull mode and the push mode as a default according to a type of the at least one processor module.

According to some aspects, modes other than the mode set as the default are optionally enabled.

According to some aspects, the at least one micro TLB disables the push mode according to a quality of service (QOS) of the at least one processor module.

According to some aspects of the disclosure, a method of updating translation lookaside buffer (TLB) of a neural processing device includes receiving a virtual address by a micro TLB, determining whether TLB miss according to the virtual address occurs, performing TLB update in a pull mode by performing a page walk when the TLB miss occurs, and performing TLB update in a push mode in response to a first update signal separately from the TLB update in a pull mode.

According to some aspects, the performing of the TLB update in a push mode includes performing TLB update in a push mode based on a processor type, TLB statistics, and quality of service (QOS) of a virtual machine to which the micro TLB corresponds.

According to some aspects, the method of updating TLB of the neural processing device further includes when a page table is updated, determining whether a first criterion is satisfied according to a type of a workload to be used by a processor module corresponding to the micro TLB, determining whether a second criterion is satisfied according to a type of a memory to be accessed by the processor module, determining whether a third criterion is satisfied according to a type of a buffer region of the memory to be accessed by the processor module, and generating a TLB entry when at least one of the first criterion to the third criterion is satisfied.

According to some aspects, the method of updating TLB of the neural processing device further includes acquiring a physical address for the virtual address after the TLB update in the pull mode is performed.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The neural processing device and a method of updating a TLB of the neural processing device of the disclosure may perform an efficient operation by explicitly updating the TLB not only in a pull mode but also in a push mode.

Accordingly, necessary address translation information may be obtained in advance by performing update under a preset condition, and thus, operations may be performed at a high speed.

In addition to the foregoing, the specific effects of the disclosure will be described together while elucidating the specific details for carrying out the embodiments below.

DETAILED DESCRIPTION

Figure 1:
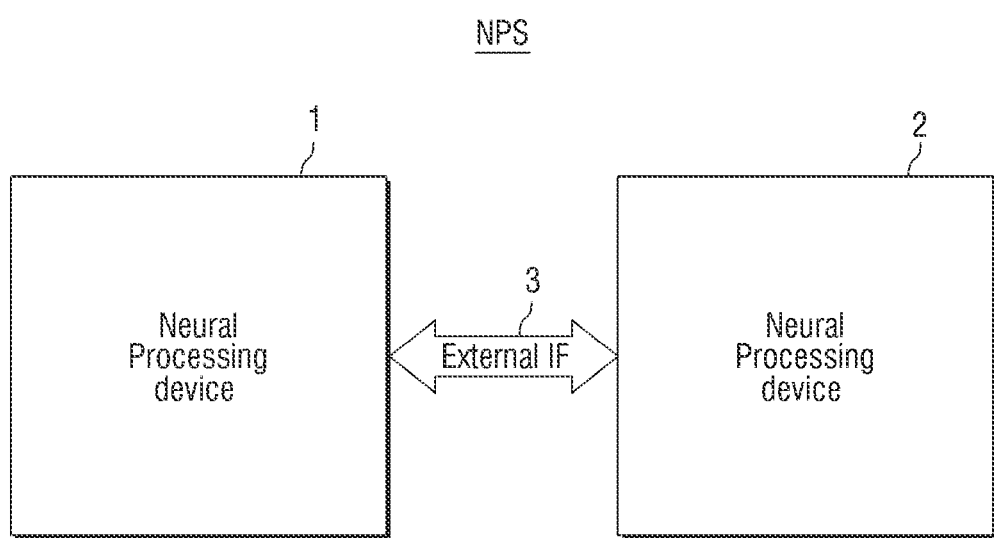
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device according to some embodiments of the disclosure will be described with reference to FIGS. 1 to 36.

FIG. 1 is a block diagram illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning computations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. In some embodiments, three or more neural processing devices may be connected to each other via the external interface 3. Also, conversely, a neural processing system NPS in accordance with some embodiments may include only one neural processing device.

In some embodiments, the first neural processing device 1 and the second neural processing device 2 may each be a processing device other than the neural processing device. In some embodiments, the first neural processing device 1 and the second neural processing device 2 may each be a graphics processing unit (GPU), a central processing unit (CPU), and other types of processing units as well. In the following, the first neural processing device 1 and the second neural processing device 2 will be described as neural processing devices for convenience.

Figure 2:
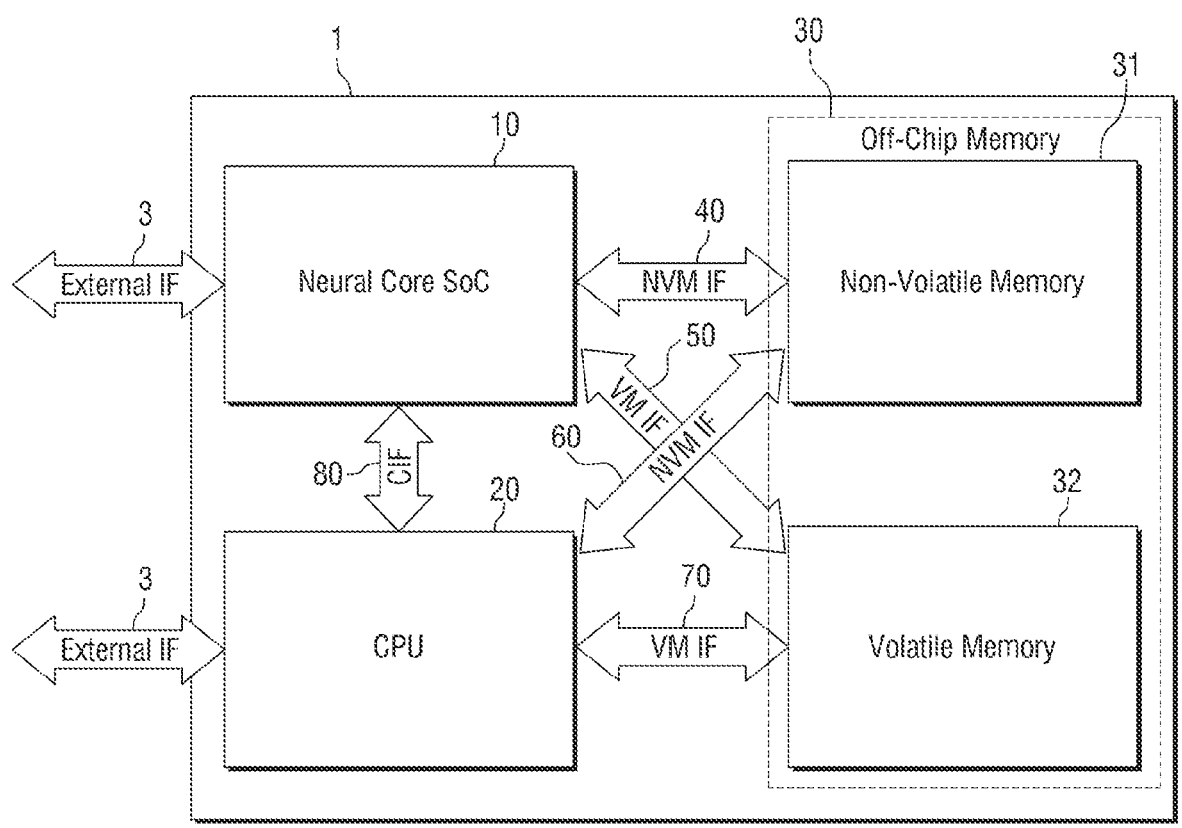
FIG. 2 is a block diagram for illustrating a neural processing device of FIG. 1.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, a second volatile memory interface 70 and a control interface (CIF) 80.

The neural core SoC 10 may be a system on a chip device. The neural core SoC 10 can be an artificial intelligence computation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external computation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program computations. The CPU 20 is a general-purpose computation device and may have low efficiency in performing simple parallel computations that are frequently used in deep learning. Accordingly, there can be high efficiency by performing computations in deep learning inference and training tasks by the neural core SoC 10.

The CPU 20 may exchange data with other external computation units via the external interface 3. Further, the CPU 20 may be connected to the non-volatile memory 31 and the volatile memory 32 via the second non-volatile memory interface 60 and the second volatile memory interface 70, respectively.

The CPU 20 may also transfer tasks to the neural core SoC 10 via commands. In some embodiments, the CPU 20 may be a kind of host that gives instructions to the neural core SoC 10. In some embodiments, the neural core SoC 10 can efficiently perform parallel computation tasks such as deep learning tasks according to the instructions of the CPU 20. The CPU 20 may transmit a translation lookaside buffer (TLB) update signal to the neural core SoC 10 as a host.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D Xpoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

The control interface 80 may be an interface for transferring control signals between the CPU 20 and the neural core SoC 10. The control interface 80 may transmit commands of the CPU 20 and transmit responses thereto of the neural core SoC 10. The control interface 80 may be, for example, PCIe (PCI Express), but is not limited thereto.

Figure 3:
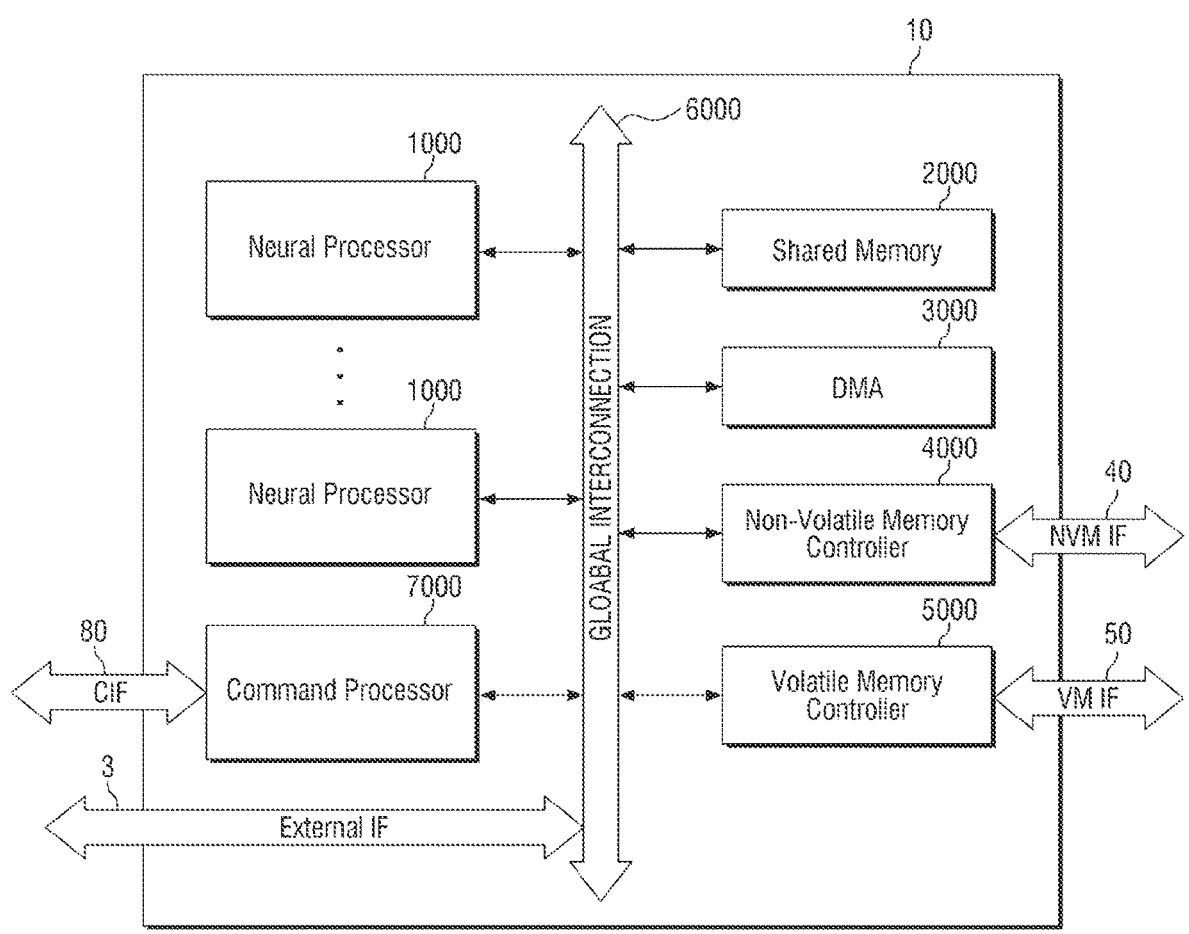
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, a direct memory access (DMA) 3000, a non-volatile memory controller 4000, a volatile memory controller 5000, a command processor 7000, and a global interconnection 6000.

The neural processor 1000 may be a computation device that directly performs computation tasks. If there are a plurality of neural processors 1000, computation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory.

Accordingly, the shared memory 2000 may include, for example, an SRAM. However, the embodiment is not limited thereto. In some embodiments, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control movements of data without needs for the neural processor 1000 or CPU 20 to control the input/output of data. Accordingly, the DMA 3000 may control data movements between memories, thereby minimizing a number of interrupts of the neural processor 1000 or CPU 20.

The DMA 3000 may control the data movements between the shared memory 2000 and the off-chip memory 30. Via the authority of the DMA 3000, the non-volatile memory controller 4000 and the volatile memory controller 5000 may perform movements of data.

The non-volatile memory controller 4000 may control tasks of reading from or writing onto the non-volatile memory 31. The non-volatile memory controller 4000 may control the non-volatile memory 31 via the first non-volatile memory interface 40. In some embodiments, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control tasks of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The command processor 7000 may be connected to the control interface 80. The command processor 7000 may receive control signals from the CPU 20 via the control interface 80. The command processor 7000 may generate tasks via the control signals received from the CPU 20 and transmit the control signals to each neural processor 1000. Further, the command processor 7000 may receive completion reports for the tasks from each neural processor 1000.

The global interconnection 6000 may connect the at least one neural processor 1000, the shared memory 2000, the DMA 3000, the non-volatile memory controller 4000, the command processor 7000, and the volatile memory controller 5000 to one another. In addition, the external interface 3 may also be connected to the global interconnection 6000. The global interconnection 6000 may be a path through which data travel between the at least one neural processor 1000, the shared memory 2000, the DMA 3000, the non-volatile memory controller 4000, the volatile memory controller 5000, the command processor 7000, and the external interface 3.

The global interconnection 6000 may transmit not only data but also control signals and signals for synchronization. In the neural processing device in accordance with some embodiments of the disclosure, each neural processor 1000 may directly transmit and receive the synchronization signals. Accordingly, latencies due to transmissions of the synchronization signals generated by the command processor 7000 can be minimized.

In other words, if there are plurality of neural processors 1000, there may be dependencies of individual tasks in which a task of one neural processor 1000 needs to be finished before the next neural processor 1000 can start a new task. The end and start of these individual tasks can be checked via the synchronization signals, and in the conventional techniques, the command processor 7000 or the host, i.e., the CPU 20, was exclusively responsible for both receiving these synchronization signals and instructing the start of a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Therefore, in the neural processing device in accordance with some embodiments of the disclosure, each neural processor 1000, instead of the command processor 7000, may directly transmit some of the synchronization signals to other neural processors 1000 according to task dependencies. In some embodiments, several neural processors 1000 can perform the synchronization tasks in parallel as compared with the method managed by the command processor 7000, thereby minimizing the latency due to synchronization.

In addition, the command processor 7000 needs to perform the task scheduling of the neural processors 1000 according to a task dependency, and the overhead of such scheduling may increase significantly as the number of neural processors 1000 increases. Therefore, in the neural processing device in accordance with some embodiments of the disclosure, scheduling tasks are also performed in part by individual neural processors 1000, and hence scheduling burden resulting therefrom can be reduced, thereby improving the performance of the device.

Figure 4:
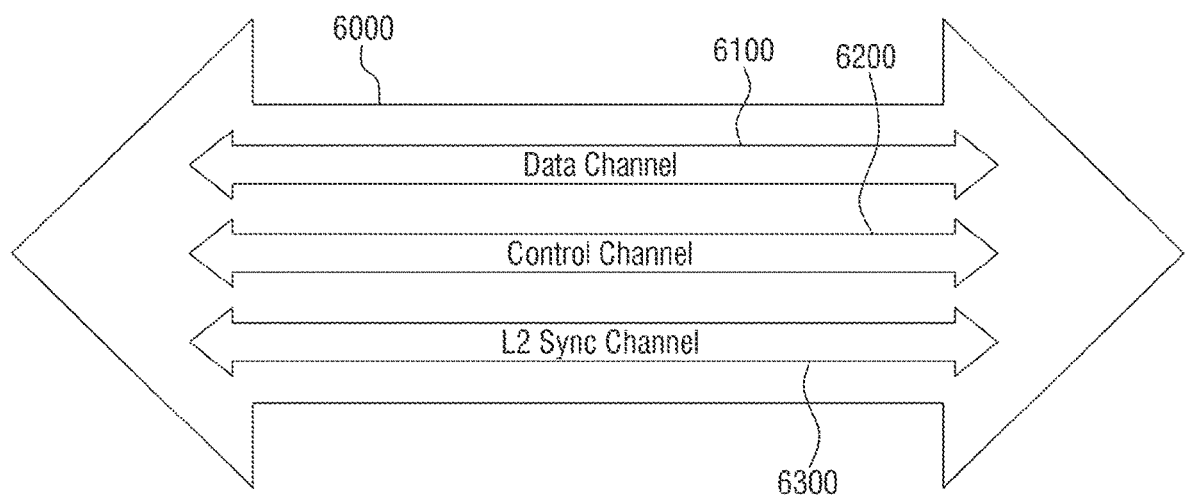
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals.

Through the control channel 6200, the at least one neural processor 1000, the shared memory 2000, the DMA 3000, the non-volatile memory controller 4000, the volatile memory controller 5000, the command processor 7000, and the external interface 3 may exchange control signals with one another.

In particular, the command processor 7000 may transmit various control signals to each neural processor 1000.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, the command processor 7000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
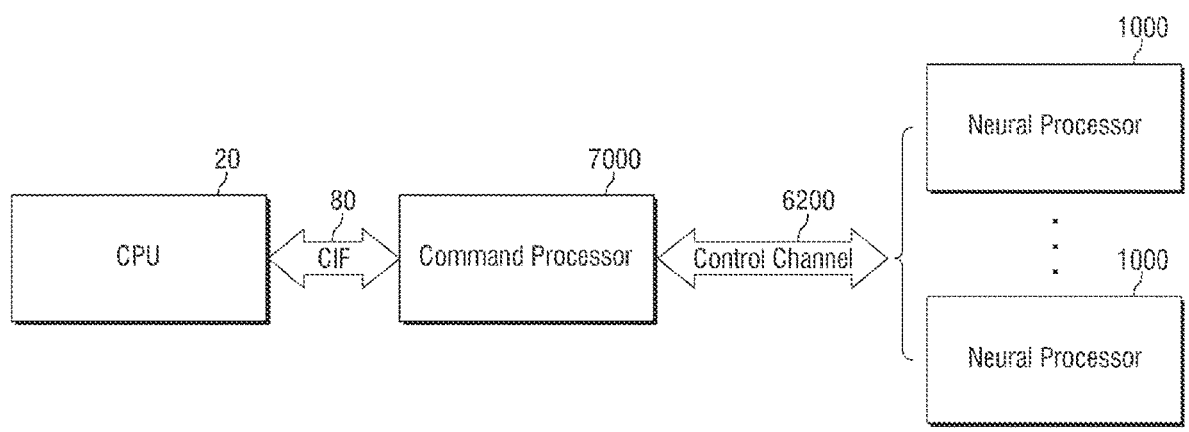
FIG. 5 is a block diagram for illustrating a flow of control signals of the neural processing device of FIG. 1.

FIG. 5 is a block diagram for illustrating a flow of control signals of the neural processing device of FIG. 1.

Referring to FIG. 5, the CPU 20 may transfer control signals to the command processor 7000 via the control interface 80. In some embodiments, a control signal may be a signal instructing execution of each operation, such as a computation task or a data load/store task.

The command processor 7000 may receive the control signals and transfer the control signals to at least one neural processor 1000 via the control channel 6200. Each control signal may be stored in the neural processor 1000 as cach task.

Figure 6:
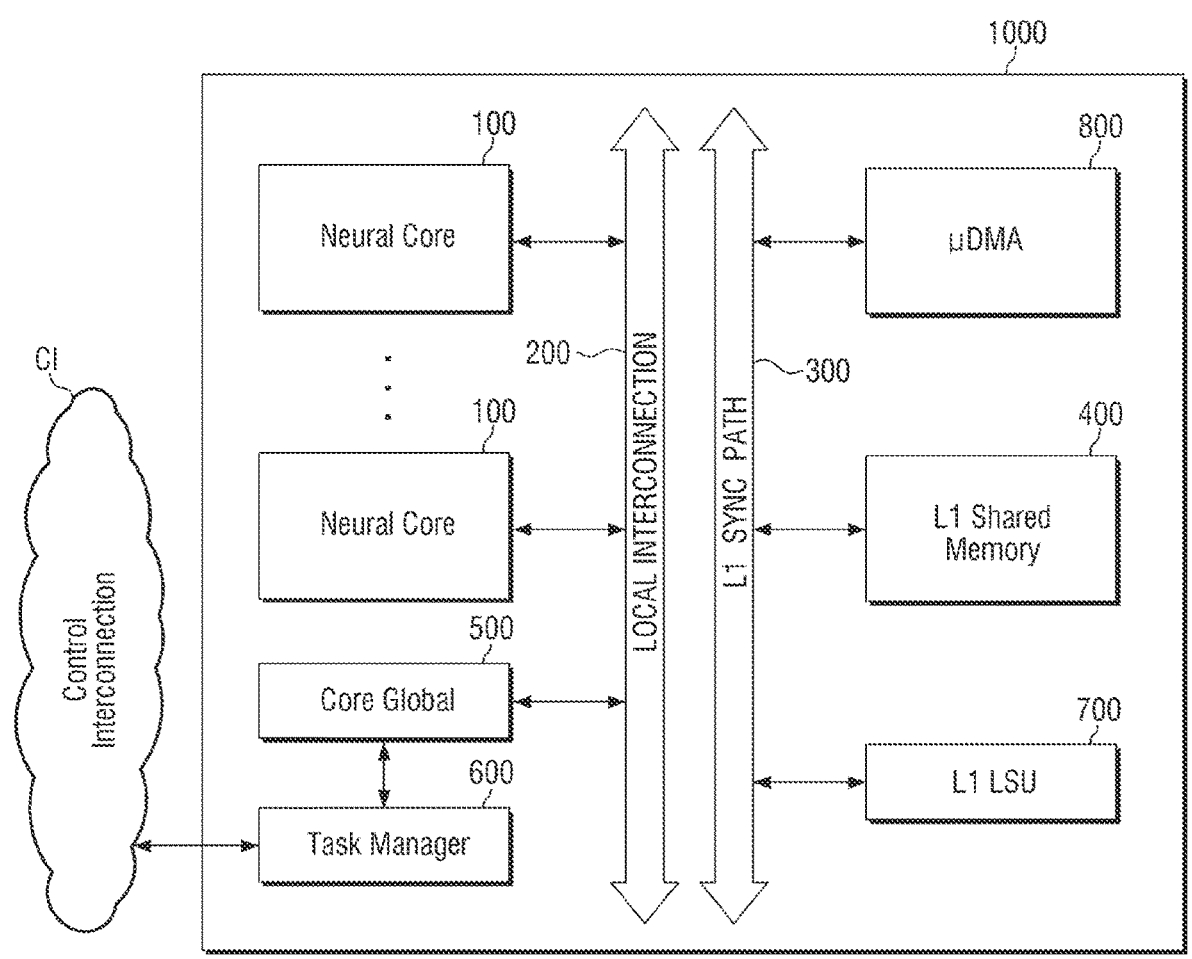
FIG. 6 is a block diagram for illustrating a neural processor of FIG. 3 in detail.

FIG. 6 is a block diagram for illustrating the neural processor of FIG. 3 in detail.

Referring to FIGS. 3 to 6, the neural processor 1000 may include at least one neural core 100, an L1 shared memory 400, an L1 load/store unit (LSU) 700, a task manager 600, a core global 500, a micro DMA 800, a local interconnection 200, and an L1 sync path 300. The L1 LSU 700, the task manager 600, and the core global 500 may be referred to respectively as an L1 LSU circuit, a task manager circuit, and a core global circuit, but for the sake of convenience, the terms are respectively unified as an L1 LSU, a task manager, and a core global. In addition, the L1 LSU 700, the task manager 600, and the core global 500 may each be implemented as a circuit or circuitry.

The at least one neural core 100 may divide and perform tasks of the neural processor 1000. The number of the neural cores 100 may be, for example, eight. However, the embodiment is not limited thereto. Although FIGS. 3 and 5 illustrate that several neural cores 100 are included in the neural processor 1000, the embodiment is not limited thereto. In some embodiments, the neural processor 1000 may include only one neural core 100.

The neural core 100 may receive task information from the core global 500 and perform a task according to the task information. In some embodiments, a task may be defined by a control signal, and the task may be any one of computation operations and memory operations. The memory operation may be, for example, any one of micro-DMA (uDMA), LP micro-DMA (Low Priority uDMA), store uDMA (STuDMA), and a pre-processing task.

The L1 shared memory 400 may be a memory shared by the neural cores 100 in the neural processor 1000. The L1 shared memory 400 may store data of cach neural core 100. In addition, the L1 shared memory 400 may receive data from the shared memory 2000 of FIG. 3, temporarily store the data, and transmit the data to the at least one neural core 100. On the contrary, the L1 shared memory 400 may receive data from the at least one neural core 100, temporarily store the data, and transmit the data to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The L1 LSU 700 may receive at least one of data, a control signal, or a synchronization signal from the outside through the global interconnection 6000. The L1 LSU 700 may transmit at least one of the received data, the received control signal, or the received synchronization signal to the L1 shared memory 400. Similarly, the L1 LSU 700 may transfer at least one of data, a control signal, or a synchronization signal to the outside through the global interconnection 6000. In addition, the L1 LSU 700 may transmit to and receive from at least one of data, a control signal, or a synchronization signal to the at least one neural core 100.

The at least one neural core 100 may receive task information from the core global 500 and perform a task according to the task information. In some embodiments, the task may be related to computation task (calculation task) or tasks related to a memory operation. The task may be defined by a control signal. The task information is on a task and may be information on a type of a task, a form of a task, additional information on a task, and so on.

The at least one neural core 100 may transmit a completion signal indicating completion of a task to the core global 500.

The task manager 600 may receive a task from a control interconnection CI. In some embodiments, the control interconnection CI may be a generic term for transmission interfaces that transmit tasks from the command processor 7000. In some embodiments, the control interconnection CI may include the control channel 6200 and the local interconnection 200.

The task manager 600 may receive a task to generate task information and transmit the task information to the core global 500. In addition, the task manager 600 may receive a completion signal through the core global 500, generate a completion report according thereto, and transmit the completion report to the command processor 7000 through the control interconnection CI.

The core global 500 may be a wire structure connected in hardware within the at least one neural core 100. Although not illustrated in FIG. 6, the core global 500 may have a structure that connects all of the at least one neural core 100, the L1 shared memory 400, the L1 LSU 700, and the task manager 600 to each other. Accordingly, the local interconnection 200 and the L1 sync path 300 may also be included in the core global 500. However, the embodiment is not limited thereto.

The core global 500 may receive task information from the task manager 600, transmit the task information to the at least one neural core 100, and receive a completion signal therefor from the at least one neural core 100. Subsequently, the core global 500 may transmit the completion signal to the task manager 600.

The micro DMA 800 may directly control movement of data without requiring the command processor 7000 or the at least one neural core 100 to control input and output of the data. Accordingly, the micro DMA 800 may control movement of data between memories to minimize the number of interrupts of the command processor 7000 or the at least one neural core 100.

The micro DMA 800 may control movement of data between the L1 shared memory 400, the shared memory 2000, and the off-chip memory 30. The movement of data may be performed through authority of the micro DMA 800.

The local interconnection 200 may connect the at least one neural core 100, the L1 shared memory 400, the L1 LSU 700, the micro DMA 800, the core global 500, and the task manager 600 to each other. The local interconnection 200 may be a movement path through which data of the at least one neural core 100, the L1 shared memory 400, the L1 LSU 700, the micro DMA 800, the core global 500, and the task manager 600 move. The local interconnection 200 may be connected to the global interconnection 6000 of FIG. 3 to transmit data therebetween.

The L1 sync path 300 may connect the at least one neural core 100, the L1 shared memory 400, the L1 LSU 700, the micro DMA 800, the core global 500, and the task manager 600 to cach other. The L1 sync path 300 may be a movement path through which synchronization signals of the at least one neural core 100, the L1 shared memory 400, the L1 LSU 700, the micro DMA 800, the core global 500, and the task manager 600 move.

The L1 sync path 300 may be formed physically separately from the local interconnection 200. In the case of the local interconnection 200, sufficient internal channels may not be formed unlike the global interconnection 6000. In some embodiments, the L1 sync path 300 may be formed separately to transmit synchronization signals quickly and without delay. The L1 sync path 300 may be used for synchronization performed at a level lower than a level of the L2 sync channel 6300 of the global interconnection 6000.

Figure 7:
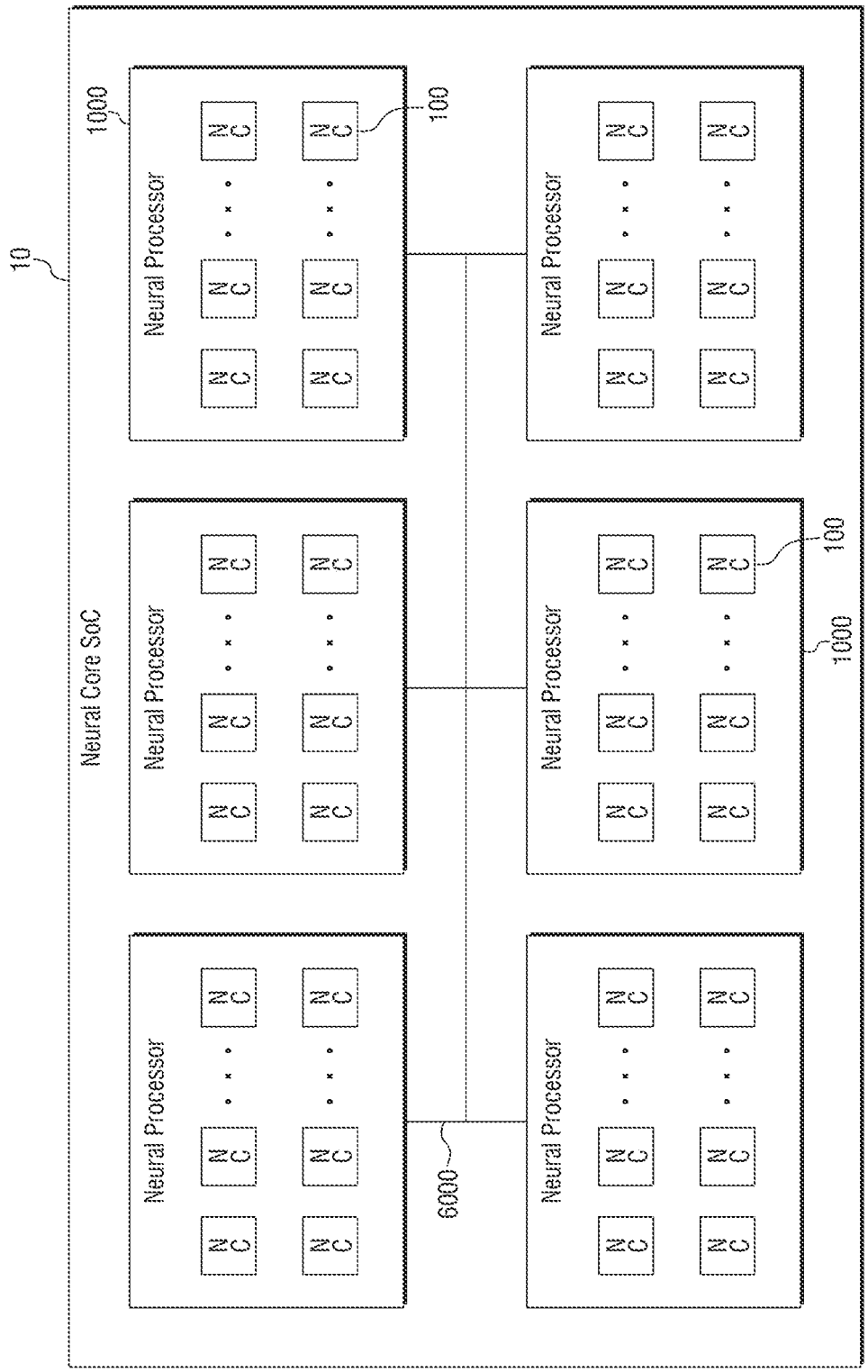
FIG. 7 is a diagram for illustrating a hierarchical structure of a neural processing device in accordance with some embodiments of the disclosure.

FIG. 7 is a diagram for illustrating a hierarchical structure of a neural processing device in accordance with some embodiments of the disclosure.

Referring to FIG. 7, the neural core SoC 10 may include at least one neural processor 1000. Each neural processor 1000 may transmit data to each other via the global interconnection 6000.

The neural processors 1000 may each include at least one neural core 100. The neural core 100 may be a unit of processing optimized for deep learning computation tasks. The neural core 100 may be a unit of processing corresponding to one operation of deep learning computation tasks. In other words, a deep learning computation task can be represented by a sequential or parallel combination of multiple operations. The neural cores 100 may cach be a unit of processing capable of processing one operation, and may be a minimum computation unit that can be considered for scheduling from the viewpoint of a compiler.

The neural processing device in accordance with the embodiment may configure scales of the minimum computation unit considered from the viewpoint of compiler scheduling and the hardware unit of processing to be the same, so that fast and efficient scheduling and computation tasks can be performed.

In some embodiments, if a unit of processing into which hardware can be divided is too large compared to computation tasks, inefficiency of the computation tasks may occur in driving the unit of processing. Conversely, it is not appropriate to schedule a unit of processing that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware unit of processing to be similar in the embodiment, it is possible to simultaneously satisfy the fast scheduling of computation tasks and the efficient execution of the computation tasks without wasting hardware resources.

Figure 8:
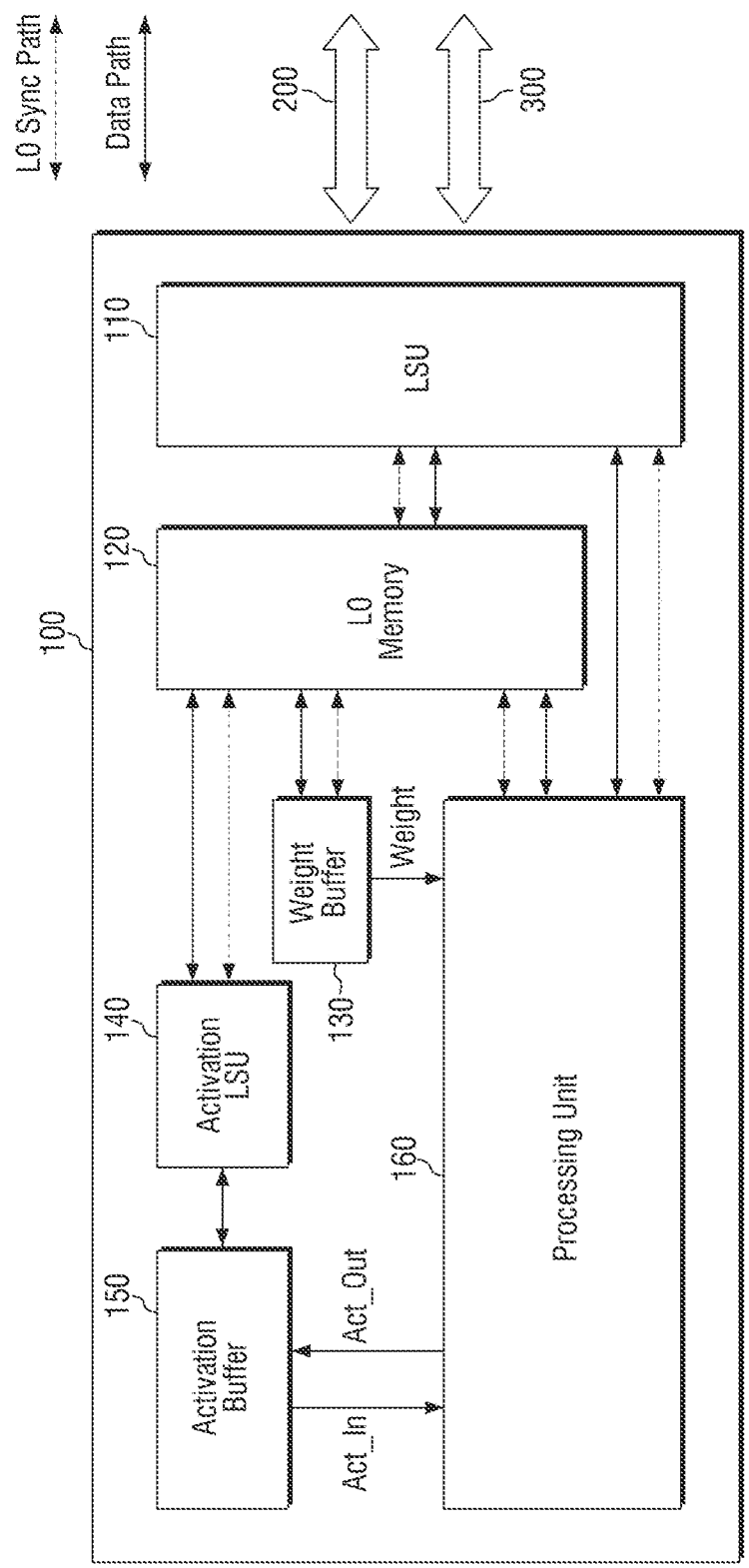
FIG. 8 is a block diagram for illustrating the neural core of FIG. 6 in detail.

FIG. 8 is a block diagram for illustrating the neural core of FIG. 6 in detail.

Referring to FIG. 8, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L1 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L1 sync path 300. In some embodiments, the LSU 110 may be referred to as an LSU circuit, but for the sake of convenience, the terms are unified as an LSU. In addition, the LSU 110 may be implemented as a circuit or circuitry.

Specifically, a micro-DMA task may be a task in which the neural core 100 loads a program or data from the shared memory 2000 or the off-chip memory 30 to the L0 memory 120. An LP micro-DMA task may be a load task for a program or data to be used later rather than a current program or data, unlike a general micro-DMA task. Since such a task has a low priority, it can be identified differently from the micro-DMA task. An ST micro-DMA task may be a store task that stores data from the L0 memory 120 of the neural core 100 to the shared memory 2000 or the off-chip memory 30. A pre-processing task may include a task that pre-loads data such as a large number of lookup tables in the CPU 20.

Figure 9:
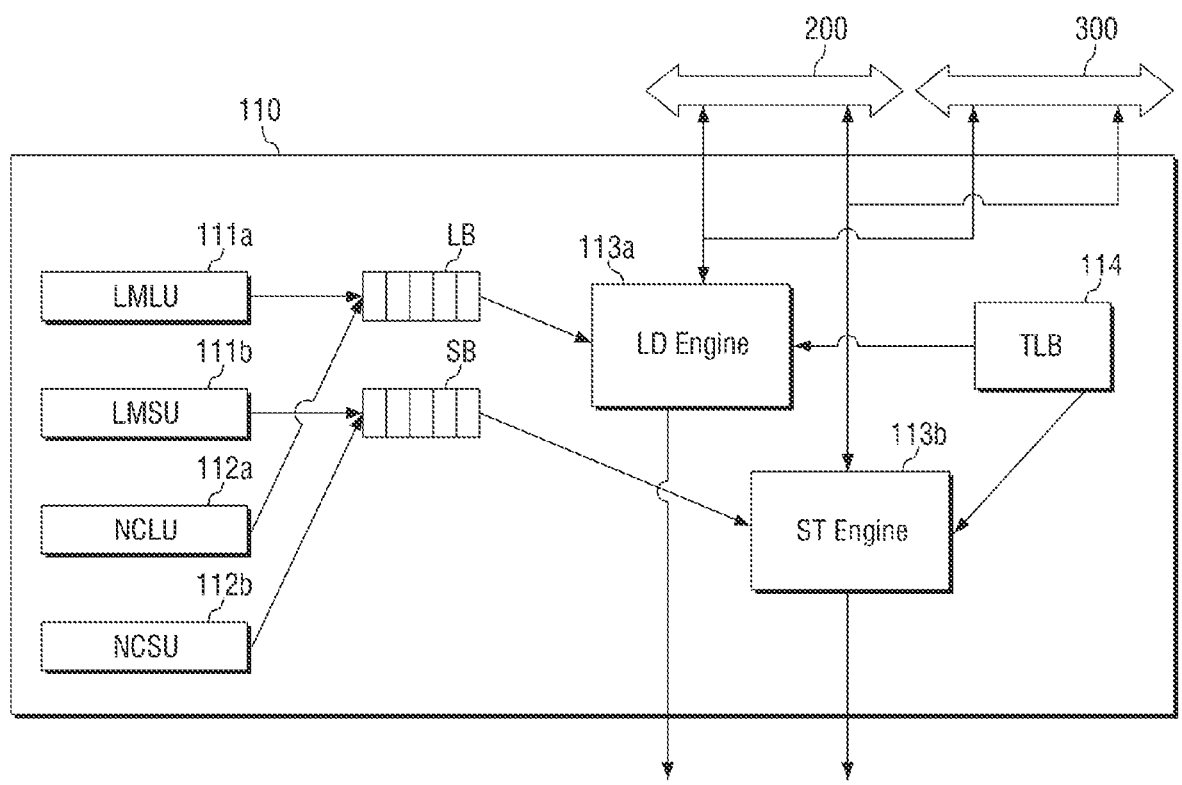
FIG. 9 is a block diagram for illustrating the LSU of FIG. 8 in detail.

FIG. 9 is a block diagram for illustrating the LSU of FIG. 8 in detail.

Referring to FIG. 9, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, the local memory load unit 111a, the local memory store unit 111b, the neural core load unit 112a, the neural core store unit 112b, the load engine 113a, and the store engine 113b may each be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. In some embodiments, the load engine 113a may quickly find the data by using a translation table of a virtual address and a physical address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. In some embodiments, the store engine 113b may quickly find the data by using a translation table of a virtual address and a physical address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L1 sync path 300. In some embodiments, the synchronization signal may indicate that the task has been completed.

Referring to FIG. 8 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a processing element (PE) array 163 and a vector unit 164. The L0 memory 120 may be a memory corresponding to the level of the neural core. In some embodiments, the L0 memory 120 may be a private memory of the neural core.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In some embodiments, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations. i.e., convolution operations. The processing unit 160 may receive an input activation Act_In, multiply it by a weight, and then add it to generate an output activation Act_Out.

Figure 10:
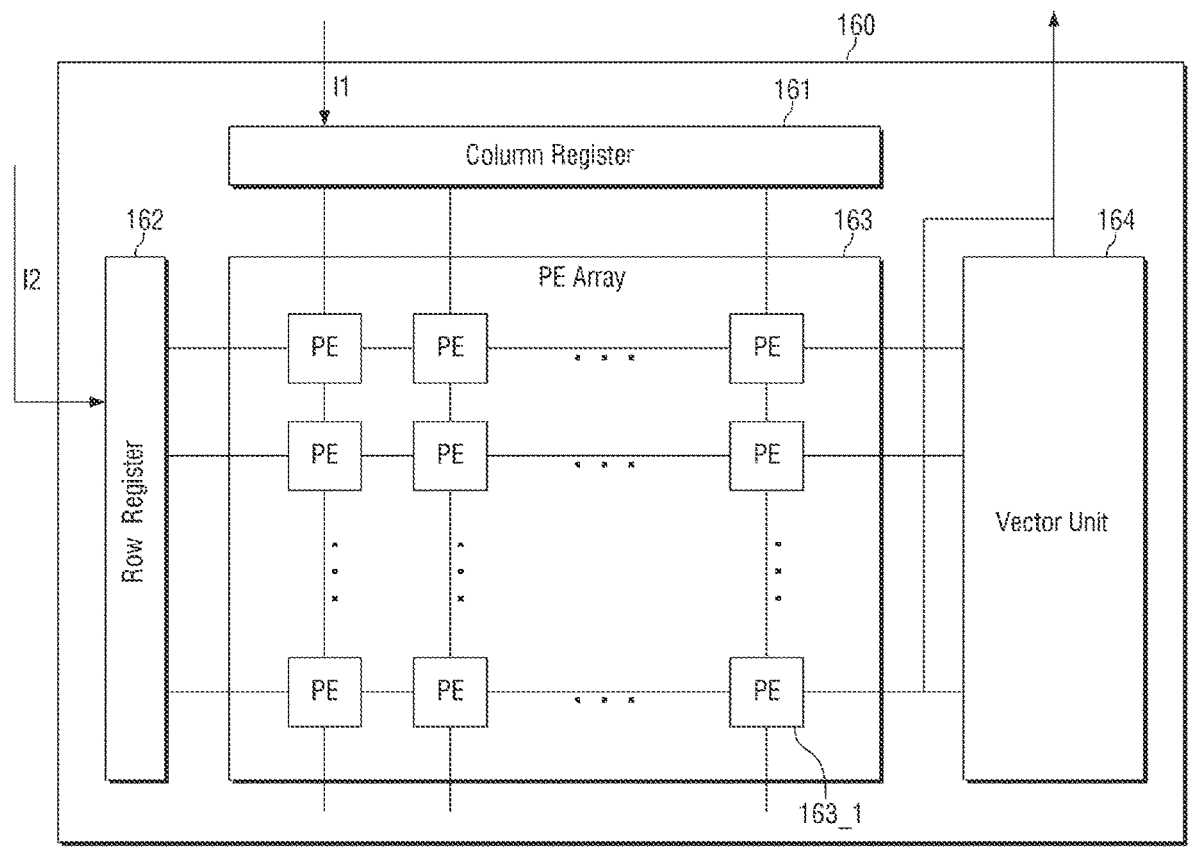
FIG. 10 is a block diagram for illustrating the processing unit of FIG. 8 in detail.

FIG. 10 is a block diagram for illustrating the processing unit of FIG. 8 in detail.

Referring to FIG. 8 and FIG. 10, the processing unit 160 may include a PE array 163, a vector unit 164, a column register 161, and a row register 162.

The PE array 163 may receive the input activation Act_In and the weight and perform multiplication on them. In some embodiments, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for cach multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 11:
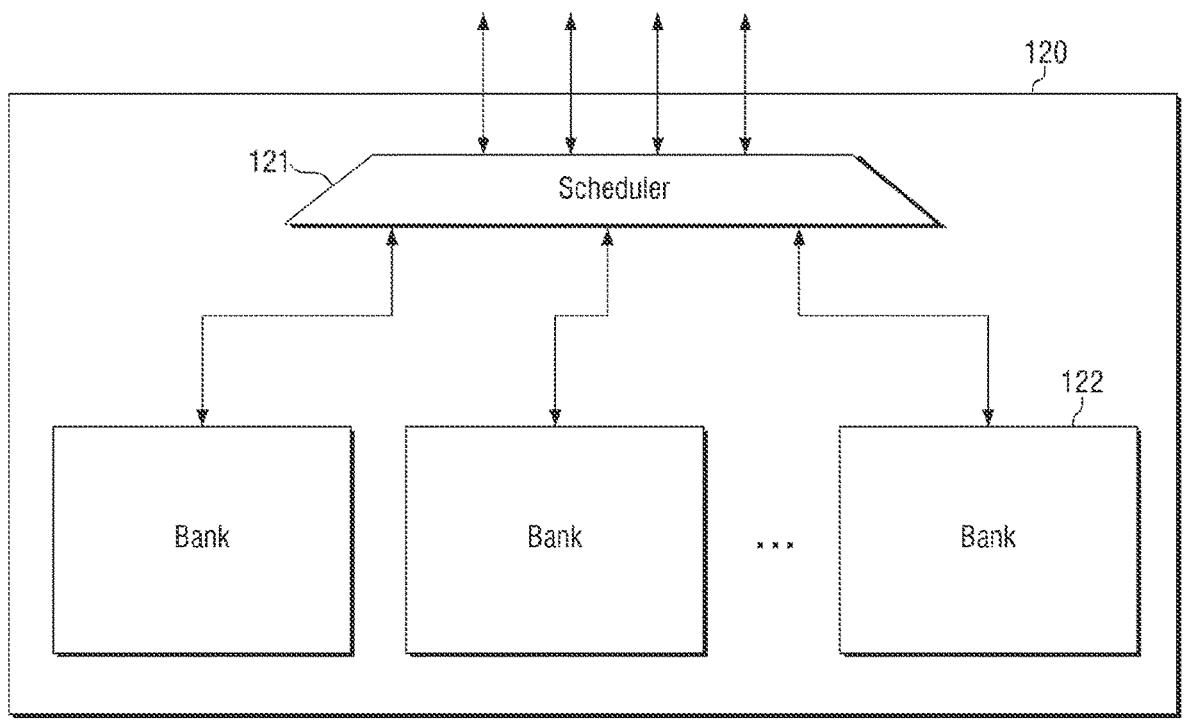
FIG. 11 is a block diagram for illustrating the L0 memory of FIG. 8 in detail.

FIG. 11 is a block diagram for illustrating the L0 memory of FIG. 8 in detail.

Referring to FIG. 11, the L0 memory 120 may include a scheduler 121 and one or more local memory banks 122.

When data is stored in the L0 memory 120, the scheduler 121 may receive data from the load engine 113a. In some embodiments, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200. In some embodiments, the scheduler 121 may be referred to as a scheduler circuit, but for the sake of convenience, the terms are unified as a scheduler. In addition, the scheduler 121 may be implemented as a circuit or circuitry.

Figure 12:
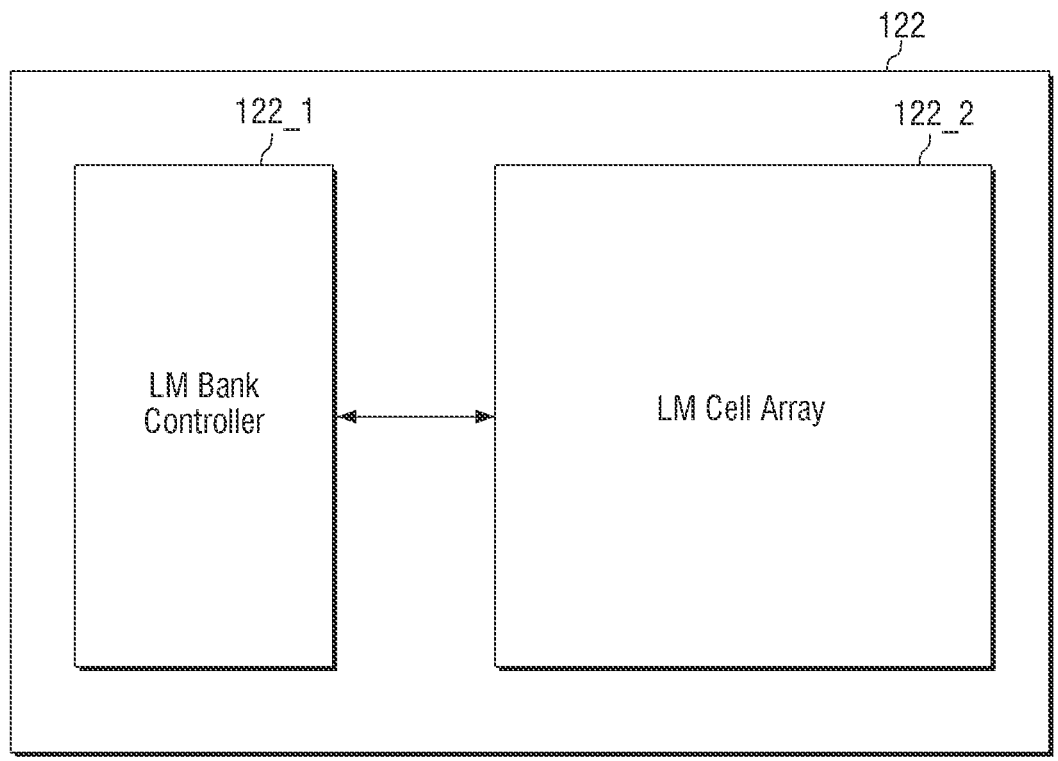
FIG. 12 is a block diagram for illustrating the local memory bank of FIG. 11 in detail.

FIG. 12 is a block diagram for illustrating the local memory bank of FIG. 11 in detail.

Referring to FIG. 12, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 13:
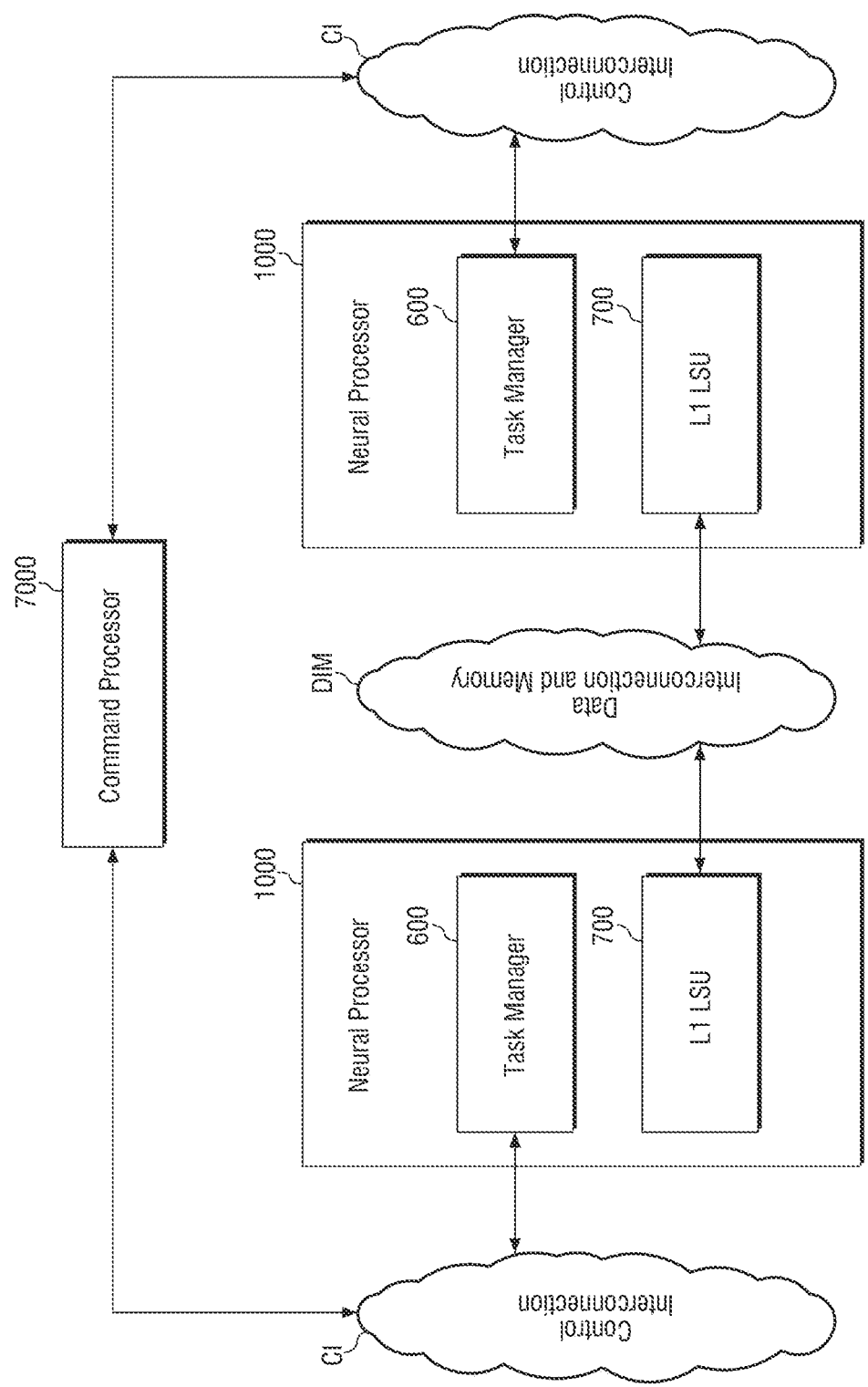
FIG. 13 is a block diagram for illustrating a flow of data and control signals of the neural processing device of FIG. 1.
Figure 14:
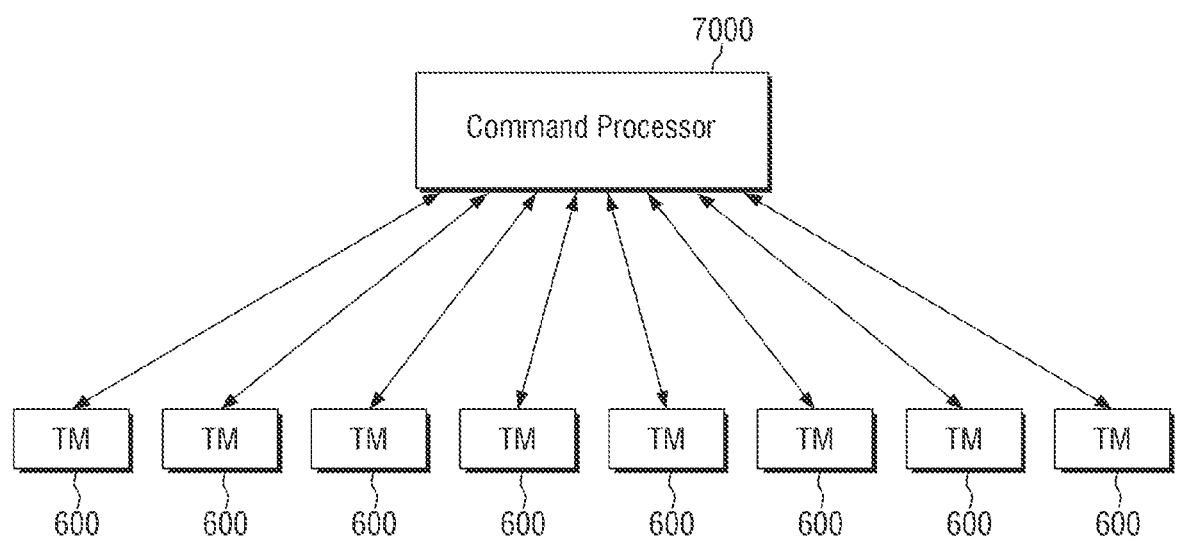
FIG. 14 is a block diagram for illustrating relationship between the command processor and the task managers of FIG. 13.

FIG. 13 is a block diagram for illustrating a flow of data and control signals of the neural processing device of FIG. 1, and FIG. 14 is a block diagram for illustrating relationship between the command processor and the task managers of FIG. 13.

Referring to FIGS. 13 and 14, the neural processor 1000 may include at least one neural core 100. Each neural processor 1000 may include a task manager 600 and an L1 LSU 700 therein, respectively. The task managers 600 may exchange control signals and responses to the control signals with a command processor 7000 via a control interconnection CI.

In contrast, the L1 LSU 700 may exchange data via a data interconnection and memory DIM. The data interconnection and memory DIM may include an interconnection for transmitting data and a memory in which data are shared. Specifically, the data interconnection and memory DIM may include a local interconnection 200 and a data channel 6100. In addition, the data interconnection and memory DIM may include an L1 shared memory 400, a shared memory 2000, and a volatile memory 32. However, the embodiment is not limited thereto.

The task managers 600 may be controlled by the command processor 7000. In some embodiments, the command processor 7000 may transfer tasks to the task managers 600 via control signals, and the task managers 600 may transfer task completion reports to the command processor 7000. At least one task manager 600 may be included in the neural processor 1000. Moreover, if the neural processors 1000 are plural, the number of task managers 600 may get larger. Such a plurality of task managers 600 may all be controlled by the command processor 7000.

Hereinafter, a neural processing system according to some embodiments of the disclosure will be described with reference to FIGS. 15 to 17. For the convenience of description, descriptions that are identical to or similar to those described above will be omitted or simplified.

Figure 15:
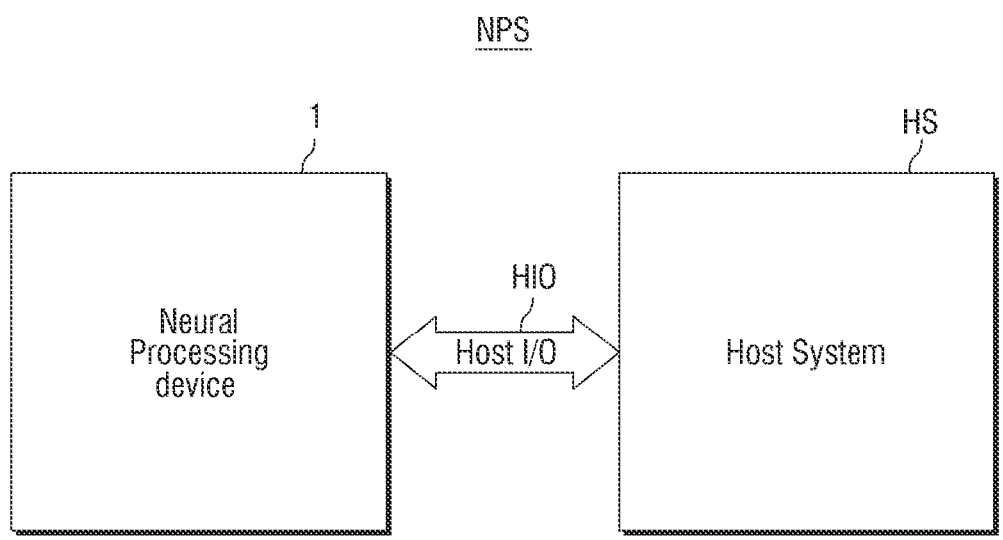
FIG. 15 is a block diagram for illustrating a neural processing system in accordance with some embodiments of the disclosure.

FIG. 15 is a block diagram for illustrating a neural processing system in accordance with some embodiments of the disclosure.

Referring to FIG. 15, a neural processing system NPS according to some embodiments of the disclosure may include a first neural processing device 1, a host system HS, and a host interface HIO.

The first neural processing device 1 may perform calculation by using an artificial neural network. The first neural processing device 1 may be, for example, a device specialized in performing deep learning calculations. However, the embodiment is not limited thereto.

The host system HS may perform overall controlling and managing of operations in the neural processing system NPS. The host system HS may transfer necessary tasks to the first neural processing device 1 and may be reported task results. In some embodiments, the host system HS may transfer deep-learning computation tasks to the first neural processing device 1 and receive results of the tasks that the first neural processing device 1 performed.

The host interface HIO may transmit and receive data and control signals to and from the first neural processing device 1 and the host system HS. The host interface HIO may be, for example, PCI express (PCIe) but is not limited thereto.

Figure 16:
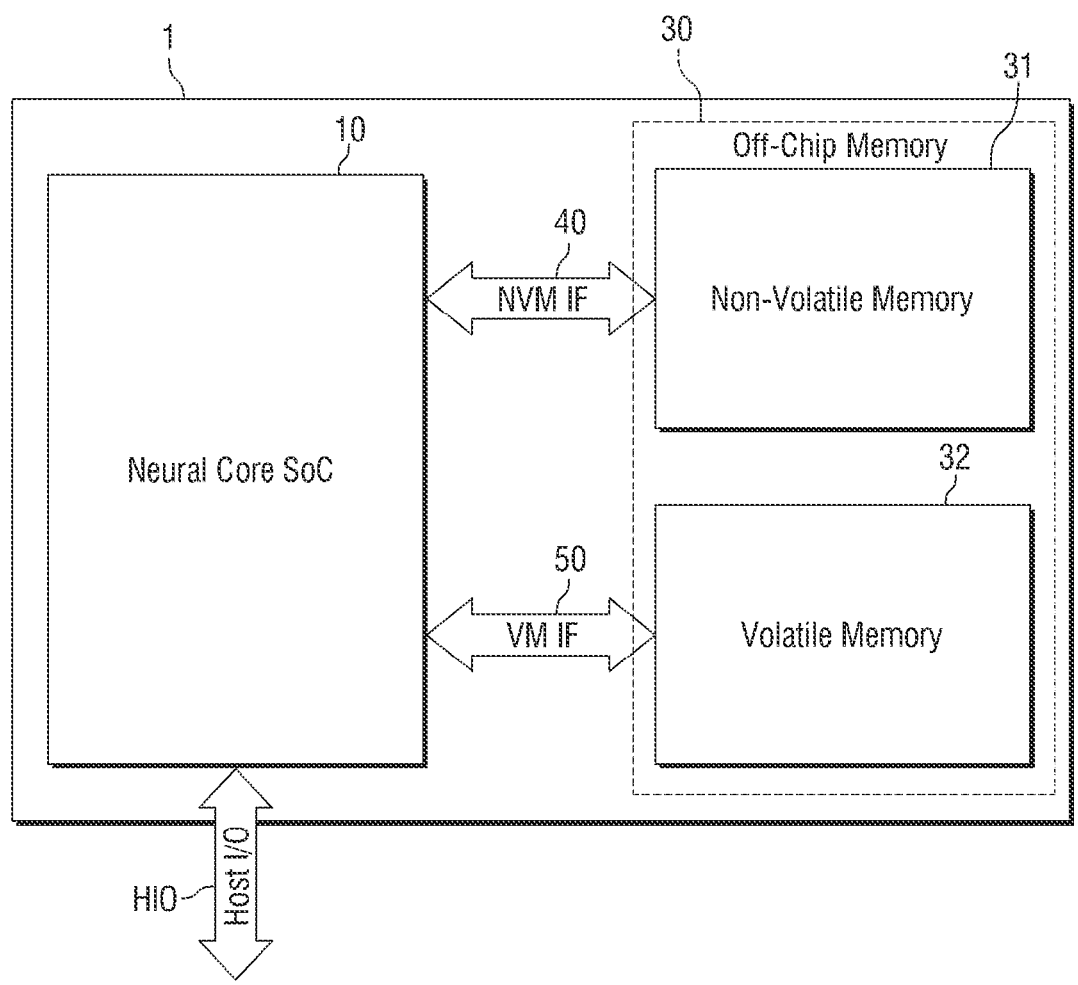
FIG. 16 is a block diagram for illustrating a neural processing device of FIG. 15 in detail.

FIG. 16 is a block diagram for illustrating the neural processing device of FIG. 15 in detail.

Referring to FIG. 16, the first neural processing device 1 may include a neural core system on chip (SoC) 10, an off-chip memory 30, a non-volatile memory interface 40, a volatile memory interface 50 and the host interface HIO.

The neural core SoC 10 may be a system on chip device. The neural core SoC 10 may be an accelerator serving as an artificial intelligence computing unit. The neural core SoC 10 may be any one of, for example, a GPU, a field programmable gate array (FPGA), or an application-specific integrated circuit (ASIC). The embodiment is not limited thereto.

The off-chip memory 30 may be arranged outside a chip of the neural core SoC 10. The off-chip memory 30 may include the non-volatile memory 31 and the volatile memory 32. The neural core SoC 10 may be connected to the non-volatile memory 31 and the volatile memory 32 via the first non-volatile memory interface 40 and the first volatile memory interface 50, respectively.

Figure 17:
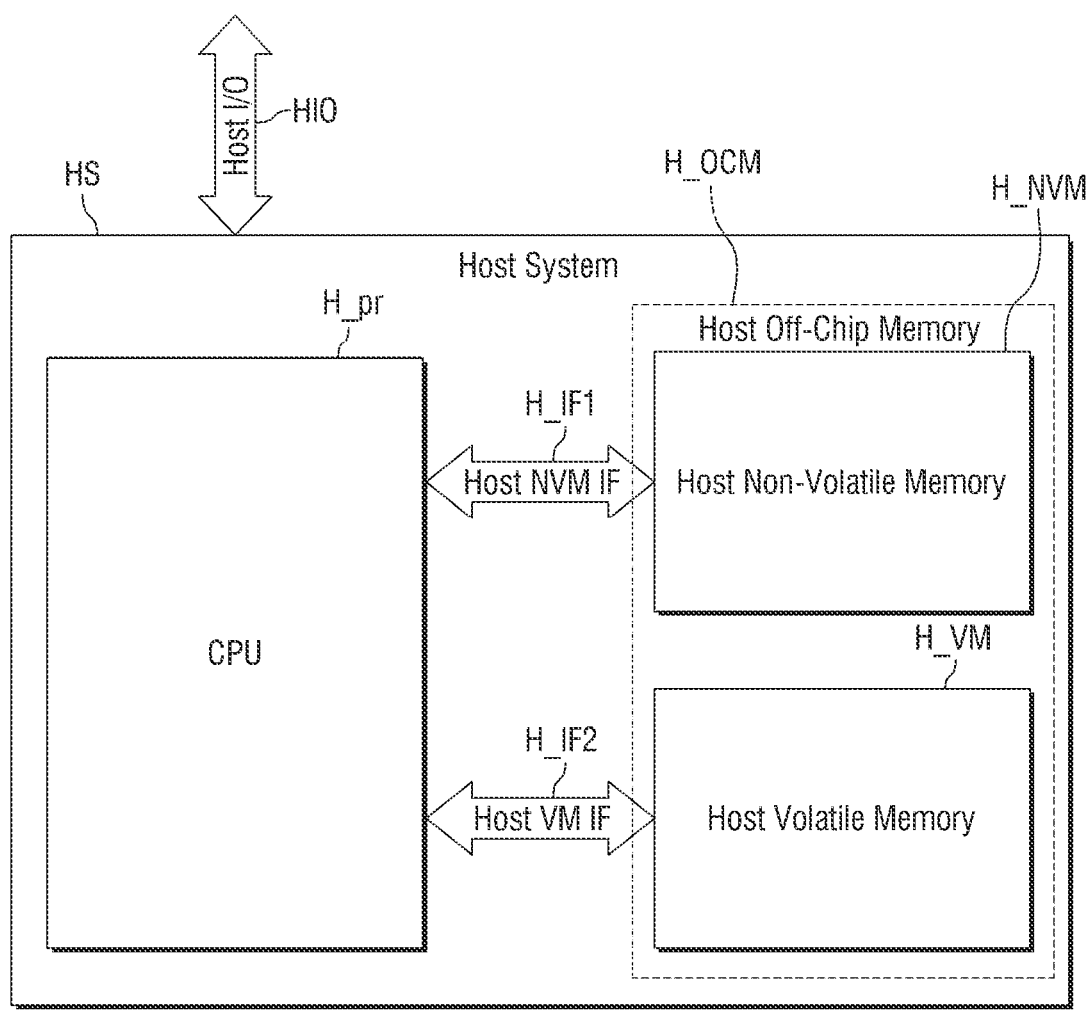
FIG. 17 is a block diagram for illustrating a host system of FIG. 15 in detail.

FIG. 17 is a block diagram for illustrating the host system HS of FIG. 15 in detail.

Referring to FIG. 17, the host system HS may include a CPU H_pr, a host off-chip memory H_OCM, a host non-volatile memory interface H_IF1, and a host volatile memory interface H_IF2.

The CPU 20 may be a control device that controls a host system HS and executes a program. The CPU 20 is a general-purpose computational unit and may have low efficiency to perform parallel simple calculations widely used in deep learning, and accordingly, the host system HS instructs the neural core SoC 10 to perform deep learning to improve operation efficiency.

The host off-chip memory H_OCM may be arranged outside a chip of the host processor H_pr. The host off-chip memory H_OCM may include the host non-volatile memory H_NVM and the host volatile memory H_VM. The host processor H_pr may be coupled with a host non-volatile memory H_NVM and a host volatile memory H_VM respectively through the host non-volatile memory interface H_IF1 and the host volatile memory interface H_IF2.

The CPU 20 may be connected to the host non-volatile memory H_NVM and the host volatile memory H_VM respectively through the host non-volatile memory interface H_IF1 and the host volatile memory interface H_IF2.

Hereinafter, a neural processing system according to some embodiments of the disclosure will be described with reference to FIG. 18. Descriptions that are identical to or similar to those described above will be omitted or simplified.

Figure 18:
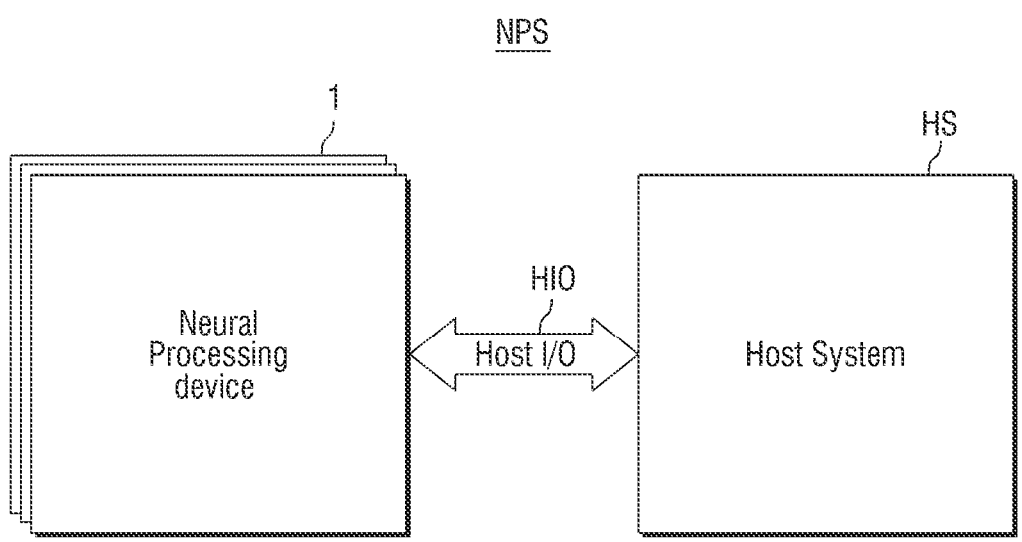
FIG. 18 is a block diagram for illustrating a neural processing system in accordance with some embodiments of the disclosure.

FIG. 18 is a block diagram illustrating a neural processing system according to some embodiments of the disclosure.

Referring to FIG. 18. The neural processing system may include a plurality of first neural processing devices 1. Each of the first neural processing devices 1 may be coupled with the host system HS through the host interface HIO. Although one host interface HIO is illustrated in the FIG. 4, the host interface HIO may include a plurality of interfaces respectively coupling the plurality of first neural processing devices 1 with the host system HS.

The plurality of first neural processing devices 1 may exchange data and signals with each other. The plurality of first neural processing devices 1 may transmit and receive data and signals to and from each other through separate interfaces thereof without passing through the host system HS. However, the embodiment is not limited thereto.

Figure 19:
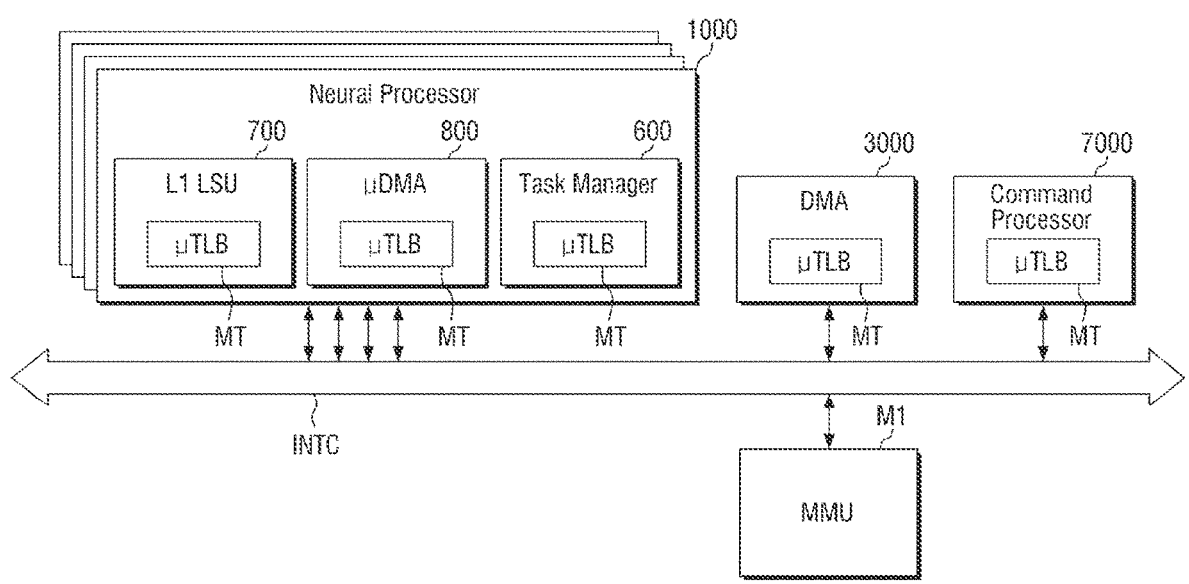
FIG. 19 is a block diagram for illustrating an operation of a micro TLB according to some embodiments of the disclosure.

FIG. 19 is a block diagram for illustrating an operation of a micro TLB according to some embodiments of the disclosure.

Referring to FIG. 19, a neural processor 1000 may include an L1 LSU 700, a micro DMA 800, and a task manager 600. There may be a plurality of neural processors 1000, and each of the neural processors 1000 may include the L1 LSU 700, the micro DMA 800, and the task manager 600.

Each of the L1 LSU 700, the micro DMA 800, and the task manager 600 may include a micro TLB MT. Each of a DMA 3000 and a command processor 7000 may also include the micro TLB MT. Although FIG. 19 illustrates micro TLBs MT for several modules, the embodiment is not limited thereto.

In some embodiments, the micro TLB MT may be included in another module not illustrated in FIG. 19, and some of the micro TLBs MT illustrated in FIG. 19 may not be included therein. In some embodiments, the micro TLBs MT may be arranged differently from the arrangement of FIG. 19. In some embodiments, the micro TLB MT may be referred to as a micro TLB circuit, but for the sake of convenience of description, the term is unified as a micro TLB MT. Also, the micro TLB MT may be implemented as a circuit or circuitry.

Each of the L1 LSU 700, the micro DMA 800, the task manager 600, the DMA 3000, and the command processor 7000 may be referred to as a processor module, a processor, or processing circuitry. The processor module may include the micro TLB MT. The processor module may be a computation module or a module that performs a memory operation. In some embodiments, the processor module may perform various operations.

In the same manner as the translation lookaside buffer 114 of FIG. 9, the micro TLB MT may quickly find data by using a recently used translation table of virtual addresses and physical addresses. The micro TLB MT may include a plurality of TLBs. In some embodiments, the micro TLB MT may collectively refer to TLBs of various levels.

In some embodiments, each of the L1 LSU 700, the micro DMA 800, the task manager 600, the DMA 3000, and the command processor 7000 may include at least one TLB, through which virtual addresses in recently accessed memory regions may be quickly translated into physical addresses.

A first memory management unit M1 may perform memory management. The first memory management unit M1 may assist in a pull mode update of at least one micro TLB MT. In some embodiments, the first memory management unit M1 may be referred to as a first memory management unit circuit, but for the sake of convenience, the terms are unified as a first memory management unit M1. Also, the first memory management unit M1 may be implemented as a circuit or circuitry.

An interconnection INTC may include the control interconnection CI of FIG. 13 and a data interconnection. In some embodiments, the data interconnection may be a part other than the memory among the data interconnection and memory DIM of FIG. 13. The interconnection INTC may transmit control signals and data. The interconnection INTC may be implemented by simplifying interconnections having a plurality of hierarchical structures.

In some embodiments, when receiving a virtual address according to an instruction or a task descriptor, each micro TLB MT may check whether the received virtual address is stored in the micro TLB MT. In some embodiments, when the virtual address is stored in the micro TLB MT, TLB hit occurs to translate the virtual address into a physical address, and accordingly, an operation may be performed quickly.

Otherwise, when the virtual address is not stored in the micro TLB MT, TLB miss may occur. In some embodiments, a page walk may be performed to translate a virtual address into a physical address. The page walk may be an operation of accessing a memory in which a page table is stored and acquiring a physical address for a necessary virtual address.

In some embodiments, the micro TLB MT may be updated in a pull mode. A pull mode update may be performed internally and automatically by the micro TLB MT. The pull mode update may be performed by a general TLB along with page walk.

When the micro TLB MT performs only the pull mode update, efficient address translation may not be performed because the most recently performed virtual address is stored mainly for translation to a physical address. Accordingly, the embodiment may perform TLB update in a push mode as well as in a pull mode.

In some embodiments, the push mode means explicitly updating the micro TLB MT by the command processor 7000 or the CPU 20 corresponding to the host. In some embodiments, the command processor 7000 may instruct each micro TLB MT to perform a push mode update in the form of an instruction or a task descriptor. A push mode update may be performed by an instruction or a task descriptor including information on translation of a virtual address into a physical address.

The command processor 7000 may transmit a first update signal to each micro TLB MT. The CPU 20 may transmit a second update signal different from the first update signal to each micro TLB MT. In some embodiments, the command processor 7000 and the CPU 20 may independently transmit signals for the push mode update.

In some embodiments, the push mode may be performed by pushing update to a preset address to the micro TLB MT at a preset time point by using the command processor 7000. Accordingly, probability of TLB miss for the next operation may be minimized and probability of TLB hit may be maximized.

Figure 20:
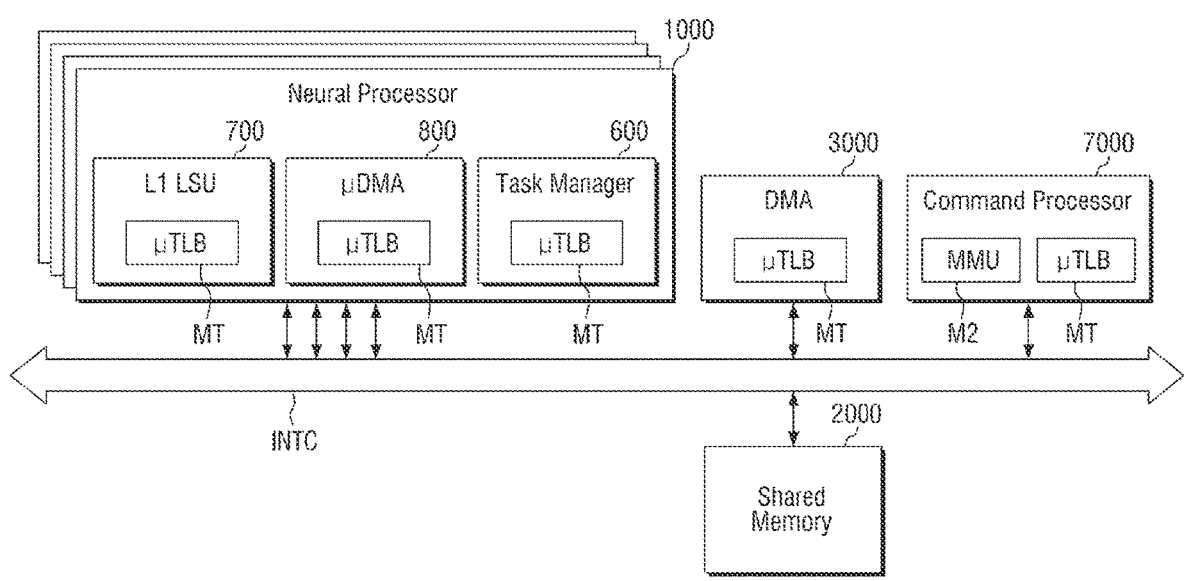
FIG. 20 is a block diagram for illustrating an operation of a micro TLB according to some embodiments of the disclosure.

FIG. 20 is a block diagram for illustrating an operation of a micro TLB according to some embodiments of the disclosure.

Referring to FIG. 20, a second memory management unit M2 may be included in the command processor 7000. Also, the shared memory 2000 may be connected to the second memory management unit M2 via the interconnection INTC. Also, although not illustrated in FIG. 20, the L1 shared memory 400 may also be connected thereto via the interconnection INTC and may be managed by the second memory management unit M2 of the command processor 7000. In some embodiments, the second memory management unit M2 may be referred to as a second memory management unit circuit, but for the sake of convenience, the terms are unified as a second memory management unit. Also, the second memory management unit M2 may be implemented as a circuit or circuitry.

Figure 21:
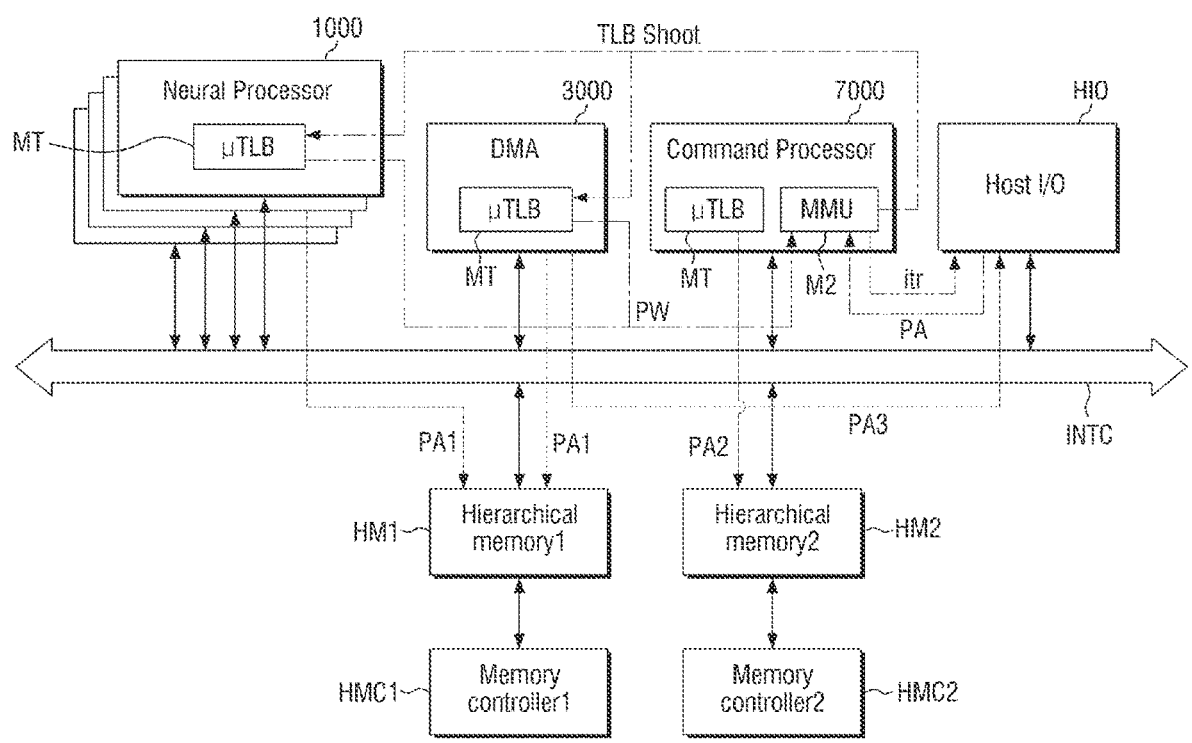
FIG. 21 is a block diagram for illustrating a pull mode operation of a neural processing device according to some embodiments of the disclosure.

FIG. 21 is a block diagram for illustrating a pull mode operation of a neural processing device according to some embodiments of the disclosure.

In FIG. 21, for the sake of convenience of description, a case where the second memory management unit M2 is included in the command processor 7000 as illustrated in FIG. 20 will be described. However, the embodiment is not limited thereto.

Referring to FIGS. 17 and 21, some embodiments of the disclosure may include a host interface HIO, a first hierarchical memory HM1, a first hierarchical memory controller HMC1, a second hierarchical memory HM2, and a second hierarchical memory controller HMC2.

In some embodiments, the first hierarchical memory controller HMC1 may be referred to as a first hierarchical memory controller circuit, but for the sake of convenience, the terms are unified as a first hierarchical memory controller HMC1. Also, the first hierarchical memory controller HMC1 may be implemented as a circuit or circuitry. Similarly, the second hierarchical memory controller HMC2 may be referred to as a second hierarchical memory controller circuit, but for the sake of convenience, the terms are unified as a second hierarchical memory controller HMC2. Also, the second hierarchical memory controller HMC2 may be implemented as a circuit or circuitry.

The host interface HIO may exchange an input and an output with the CPU 20, that is, the host system HS. The host interface HIO may include the control interface CI of FIG. 13. The host interface HIO may transmit a control signal, such as a command, and data. In some embodiments, the host interface HIO may exchange various control signals and data with the command processor 7000. The host interface HIO may be, for example, PCI express (PCIe), but is not limited thereto.

Each of the first hierarchical memory HM1 and the second hierarchical memory HM2 may include at least one of the shared memory 2000 of FIG. 3, the L1 shared memory 400 of FIG. 6, the L0 memory 120 of FIG. 8, or the off-chip memory 30 of FIG. 2. In some embodiments, each of the first hierarchical memory HM1 and the second hierarchical memory HM2 may include several hierarchically distributed memories. In general, a translation table required for page walk PW may be stored in the volatile memory 32 of the off-chip memory 30 of FIG. 2. However, the embodiment is not limited thereto.

The first hierarchical memory controller HMC1 may be a controller of the first hierarchical memory HM1, and the second hierarchical memory controller HMC2 may be a controller of the second hierarchical memory HM2. The first hierarchical memory controller HMC1 and the second hierarchical memory controller HMC2 may respectively control the first hierarchical memory HM1 and the second hierarchical memory HM2.

The first hierarchical memory HM1 may have a first physical address PA1, and the second hierarchical memory HM2 may have a second physical address PA2. The micro TLB MT may check whether there is a table for translating a virtual address of the first hierarchical memory HM1 into the first physical address PA1 when accessing the first hierarchical memory HM1.

Similarly, the micro TLB MT may check whether there is a table for translating a virtual address of the second hierarchical memory HM2 into the second physical address PA2 when accessing the second hierarchical memory HM2.

When the micro TLB MT confirms that there is a table for translating virtual addresses into the first physical address PA1 and the second physical address PA2, this corresponds to the TLB hit. When the micro TLB MT confirms the TLB hit, the neural processor 1000, the DMA 3000, and the command processor 7000 may directly access the first hierarchical memory HM1 and the second hierarchical memory HM2.

In addition, accessing the host off-chip memory H_OCM of FIG. 17 arranged outside a chip may be performed according to the third physical address PA3 via the host interface HIO. In some embodiments, when the micro TLB MT confirms the TLB hit according to the third physical address PA3, the neural processor 1000, the DMA 3000, and the command processor 7000 may access the host off-chip memory H_OCM via the host interface HIO.

When the micro TLB MT does not have a translation table for each of the first physical address PA1, the second physical address PA2, and the third physical address PA3, this may correspond to a TLB miss. In case of the TLB miss, the micro TLB MT may perform a page walk PW. The page walk PW may indicate pulling the translation table for a corresponding virtual address and a corresponding physical address from a memory in which the translation table is stored. The page walk PW is performed for the second memory management unit M2, and accordingly, a pull mode TLB update may be performed. The second memory management unit M2 may pull a translation table of a page corresponding to the page walk PW. The second memory management unit M2 may directly pull the translation table when the translation table is in the first hierarchical memory HM1 or the second hierarchical memory HM2. In contrast to this, when the translation table is in the host off-chip memory H_OCM, the second memory management unit M2 may pull the translation table through the host interface HIO. Alternatively, the host system HS may also transmit the previously translated physical address to the second memory management unit M2 through the host interface HIO.

Meanwhile, the second memory management unit M2 may perform a TLB shoot by using cach micro TLB MT. The TLB shoot means invalidating a translation table for a corresponding virtual address and a corresponding physical address. In some embodiments, when the translation table is invalid due to a certain cause, the second memory management unit M2 may stop the translation of the corresponding virtual address by the TLB shoot and induce a page walk PW to occur.

When the second memory management unit M2 fails to find the translation table for the corresponding virtual address and the corresponding physical address in the first hierarchical memory HM1 and the second hierarchical memory HM2, the second memory management unit M2 may transmit an interrupt itr to the host interface HIO and receive a translation table or a physical address PA in response thereto. The physical address PA may include at least one of a first physical address PA1, a second physical address PA2, or a third physical address PA3.

In some embodiments. FIG. 21 illustrates a pull mode TLB update that pulls a translation table for a corresponding virtual address and a corresponding physical address through a page walk.

Figure 22:
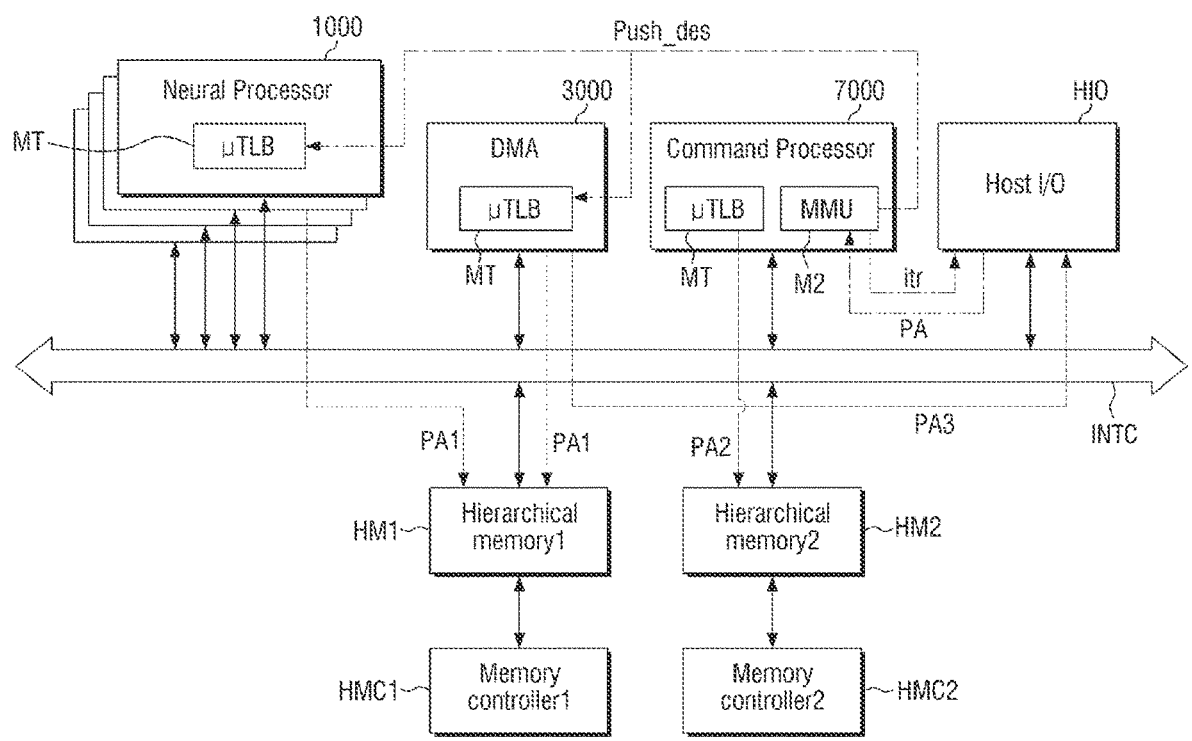
FIG. 22 is a block diagram for illustrating a push mode operation of a neural processing device according to some embodiments of the disclosure.

FIG. 22 is a block diagram for illustrating a push mode operation of a neural processing device according to some embodiments of the disclosure.

Referring to FIG. 22, the micro TLB MT may be updated in a push mode, unlike the pull mode in which the micro TLB MT directly pulls update information. The second memory management unit M2 may directly transmit a push descriptor Push_des to each micro TLB MT. In some embodiments, the push descriptor Push_des may be replaced with an instruction form or another signal form instead of a descriptor form.

The push descriptor Push_des may include a translation table of a physical address to a preset virtual address. Accordingly, the micro TLB MT may be updated by receiving the translation table included in the push descriptor Push_des. In some embodiments, the push mode TLB update may be performed in which the command processor 7000 updates the TLB by pushing update information rather than the TLB pulling the update information.

Although FIG. 22 illustrates that the push descriptor Push_des is transmitted by the command processor 7000, the embodiment is not limited thereto. The host, the CPU 20 of FIG. 17, may directly transmit the push descriptor Push_des via the host interface HIO.

In some embodiments, when the push descriptor Push_des transmitted by the command processor 7000 is referred to as a first update signal, the push descriptor Push_des transmitted by the CPU 20 may be defined as a second update signal different from the first update signal. In some embodiments, the first update signal and the second update signal may be compatible with each other and may be transmitted independently. Alternatively, only one of the command processor 7000 or the CPU 20 may transmit the push descriptor Push_des.

Figure 23:
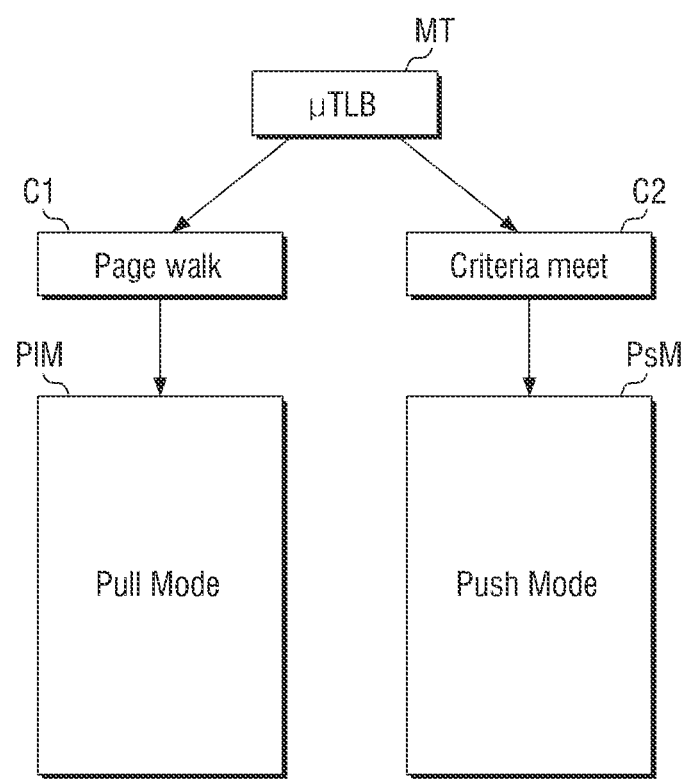
FIG. 23 is a block diagram for illustrating mode operation conditions of a micro TLB according to some embodiments of the disclosure.
Figure 24:
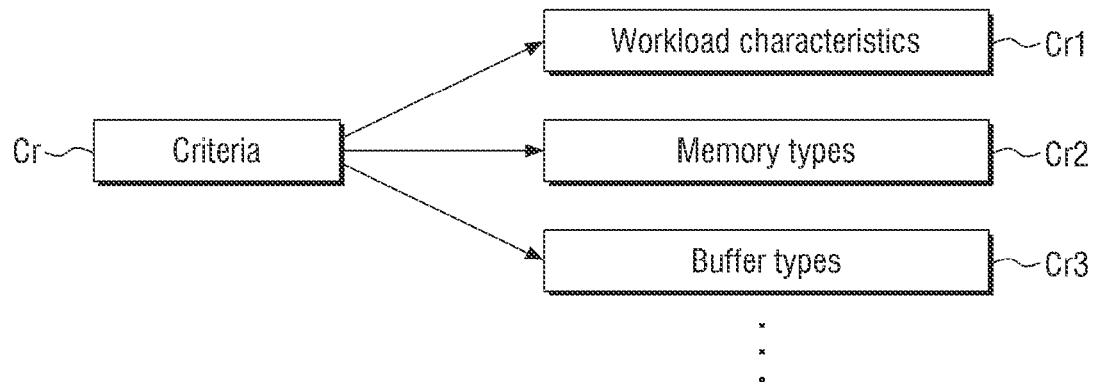
FIG. 24 is a conceptual diagram for illustrating conditions of a push mode operation of FIG. 23.

FIG. 23 is a block diagram for illustrating mode operation conditions of a micro TLB according to some embodiments of the disclosure, and FIG. 24 is a conceptual diagram for illustrating conditions of a push mode operation of FIG. 23.

Referring to FIG. 23, the micro TLB MT may operate in a pull mode PIM when a first condition C1 is satisfied and may operate in a push mode PsM when a second condition C2 is satisfied. The first condition C1 may indicate that a page walk is performed. In some embodiments, when TLB miss occurs and a page walk is performed, the first condition C1 is satisfied, and the micro TLB MT may perform TLB update in the pull mode PIM.

The second condition C2 may indicate that criteria are satisfied (criteria meet). In some embodiments, criteria Cr may include at least one of a first criterion Cr1, a second criterion Cr2, or a third criterion Cr3. Although FIG. 24 illustrates three criteria, the number of criteria Cr according to the embodiment is not limited thereto. In some embodiments, the criteria Cr according to the embodiment may be 2 or less, or 4 or more.

The first criterion Cr may be a criterion according to workload characteristics. For example, the first criterion Cr1 may be at least one of whether a workload is for a next layer (or a sublayer) of a current layer of a neural network model, whether the workload is for a front layer of the neural network model, or whether the workload is for single stream inference.

In some embodiments, the machine learning model may include a plurality of successive layers and a layer for which the neural processor 1000 is executing tasks may be referred to as the current layer of the neural network model. In some embodiments, a layer for which the neural processor 1000 is processing tasks may be referred to as the current layer of the machine learning model. In some embodiments, when the next layer may be an immediately next layer, the current layer is the i-th layer and the immediately next layer is the (i+1)-th layer. In some embodiments, a plurality of successive layers of the machine learning model may be classified to a front layer, a middle layer, and a back layer or to a front layer and a back layer. For example, if the machine learning model has 10 successive layers, the first layer or the first and second layers may belong to the front layer, the 10-th layer or the 9-th and 10-th layers may belong to the back layer. When the plurality of successive layers are indexed, one or more layers whose indices are smaller than a reference number may belong to the front layer.

Specifically, in the neural network model, access to a same virtual address is frequent for a same layer. Therefore, when the micro TLB MT is updated in a push mode for each workload of each layer of the neural network model, the speed and efficiency of tasks may be maximized.

In addition, in a same network model, the same virtual address is often accessed even when the layer is changed. In some embodiments, the micro TLB MT may be updated in the push mode only for the workload of the front layer of the neural network model, rather than using the push mode update for each layer.

In addition, when there is an input in a single stream rather than in multi-batch during an inference process, the latency for TLB update is highly likely to affect work performance. Therefore, even when a workload for single stream inference is input, latency may be minimized by performing the TLB update in advance in the push mode.

The second criterion Cr2 may be a criterion according to the type of a memory to be accessed by the micro TLB MT. For example, the second criterion Cr2 may be at least one of whether the memory to be accessed by the micro TLB is an on-chip memory or whether the memory to be accessed by the micro TLB is a memory for peer to peer (P2P) data access beyond a chip boundary of the neural processing device 1.

Specifically, unlike the off-chip memory 30, on-chip memories, such as the L0 memory 120, the L1 shared memory 400, and the shared memory 2000 within the neural Core SoC 10 may statically store data such that a virtual address is maintained. Accordingly, the push mode TLB update may be performed efficiently.

In addition, when a memory to be accessed by the micro TLB MT is a memory for P2P data access beyond the chip boundary of the neural processing device 1, that is, in the off-chip memory 30 or the host off-chip memory H_OCM rather than an internal memory of the neural core SoC 10, the push mode TLB update may be efficient because access to a virtual address of a nearby region is clearly determined in advance.

The third criterion Cr3 may be a criterion according to a type of buffer region to be accessed by the micro TLB MT. For example, the third criterion Cr3 may be at least one of whether a buffer region to be accessed by the micro TLB MT is a read-only sharable memory region, whether a buffer region to be accessed by the micro TLB MT is a buffer region of a backed register file, whether a buffer region to be accessed by the micro TLB MT is a partial region for register spilling, whether a buffer region to be accessed by the micro TLB MT is smaller than a threshold size and accessed more frequently than a threshold frequency, whether a buffer region to be accessed by the micro TLB MT is a buffer region for a command descriptor, or whether a buffer region to be accessed by the micro TLB MT is a region for optional memory mapped files. An array of processor registers in the neural processor 1000 or the neural core SoC 10 may be referred to as a register file. The processor register may be a quickly accessible location available to the neural processor 1000 or the neural core SoC 10. If there are not enough registers to hold all the variables, some variables may be moved to and from at least one memory of the various memory modules described above and this process may be called "spilling" the registers. In some embodiments, a memory-mapped file may be a segment of a virtual memory containing the contents of a file.

Specifically, the buffer region may refer to a software allocation region of a memory. When a buffer region to be accessed by the micro TLB MT is a read-only sharable memory region, such as a region where kernel weight values of a neural network model are stored, or when a buffer region to be accessed by the micro TLB MT is a buffer region of a backed register file or partial region for register spilling, the buffer region to be accessed by the micro TLB MT may be frequently used and may be a latency-sensitive region, and thus, the push mode may be effective.

In addition, a region smaller than a threshold size is more sensitive to latency, and a region accessed more frequently than a threshold frequency may increase efficiency of the push mode TLB update. For the same reason, a buffer region for a command descriptor and a buffer region for an optional memory mapped file may also be highly efficient in the push mode TLB update. The command descriptor may include detailed information on a command. The command may include both a memory operation, such as a DMA operation, and a computation operation.

The third criterion Cr3 may not satisfy a buffer region that is dynamically changed to a large size, that is, with large variability, such as a heap buffer of a stack buffer, and may satisfy a buffer region with a static size.

The first criterion Cr1 to the third criterion Cr3 may be determined independently, but may be determined in combination with each other. For example, when kernel weight values of layers 0 and 1 of a single stream inference model are loaded in the L0 memory 120, all of the first criterion Cr1 to the third criterion Cr3 may be applied.

Alternatively, a buffer region accessed by multiple processors that do not satisfy the first criterion Cr1 and the second criterion Cr2 but satisfy the third criterion Cr3 may be able to select both a push mode and a pull mode, but a buffer region where TLB shootdown is expected according to a page table change may operate in the push mode.

Also, as an additional criterion, a processor using a general-purpose workload, such as a CPU, may operate in the pull mode as a default, but the neural processing device of the embodiment may operate in the push mode as a default.

In some embodiments, the push mode may be disabled according to circumstances. In some embodiments, when statistical values of the micro TLB MT are calculated for each neural processor 1000, the micro TLB MT may be updated in the pull mode without the push mode. For example, when TLB miss is greater than a reference value, the push mode may be disabled.

In addition, the embodiment may change settings of a push mode and a pull mode for each virtual machine in the process of operating multiple virtual machines. For example, a virtual machine with a high priority according to each virtual machine's quality of service (QOS) operates in a push mode, and a virtual machine with a low priority operates in a pull mode, and thus, waste of resources according to the push mode may be minimized.

Figure 25:
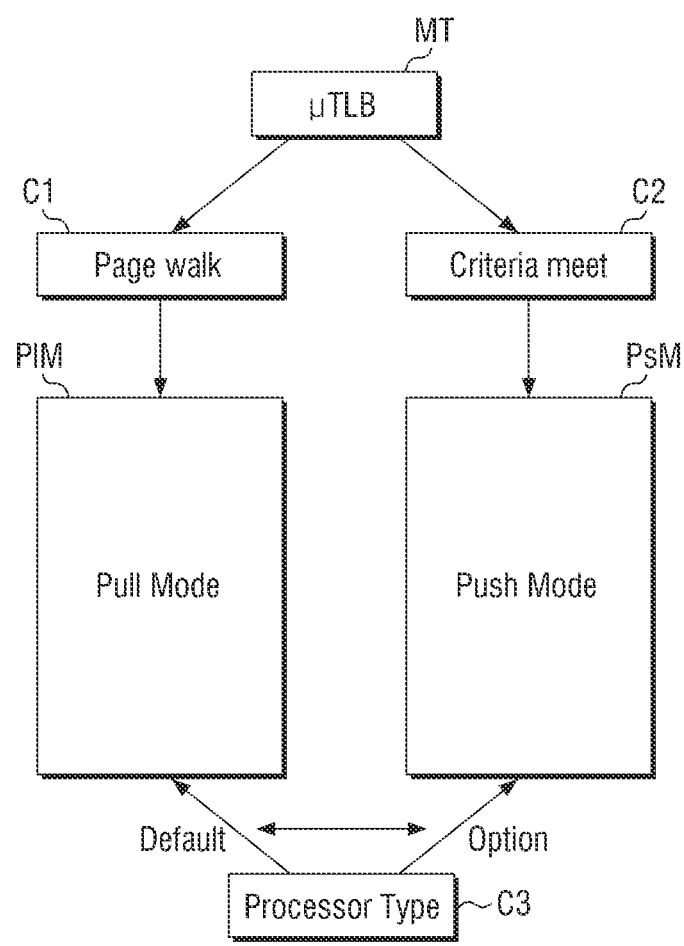
FIG. 25 is a conceptual diagram for illustrating settings of mode operations of a micro TLB according to some embodiments of the disclosure.

FIG. 25 is a conceptual diagram for illustrating operations of mode operations of a micro TLB according to some embodiments of the disclosure.

Referring to FIG. 25, the micro TLB MT may operate in either a pull mode PIM or a push mode PsM as a default. In some embodiments, both the pull mode PIM and the push mode PsM are not always performed, and only one of the pull mode PIM and the push mode PsM may operate in updating the micro TLB MT.

In some embodiments, which mode is performed as a default may be determined under a third condition C3. The third condition C3 may include the type of a processor module. However, the embodiment is not limited thereto. Specifically, the third condition C3 may set the pull mode PIM as a default when the type of the processor module is general, that is, when the processor module is a general-purpose processor such as a CPU. In some embodiments, update of the micro TLB MT may be performed in the push mode PsM and may be optionally performed only when the pull mode PIM is enabled.

In contrast to this, when the processor type is a neural processing device of a preset purpose, such as a neural processing unit (NPU), the push mode PsM may be set as a default. However, the embodiment is not limited thereto. In some embodiments, when a processor has a preset purpose, efficiency of the TLB update may be performed efficiently due to a large number of repeated operations and repeatedly referenced data.

Furthermore, since a plan for which operation is to be performed is determined in advance, when the TLB update is performed in the push mode PsM rather than the pull mode PIM, efficiency may be maximized, and latency may be minimized.

Figure 26:
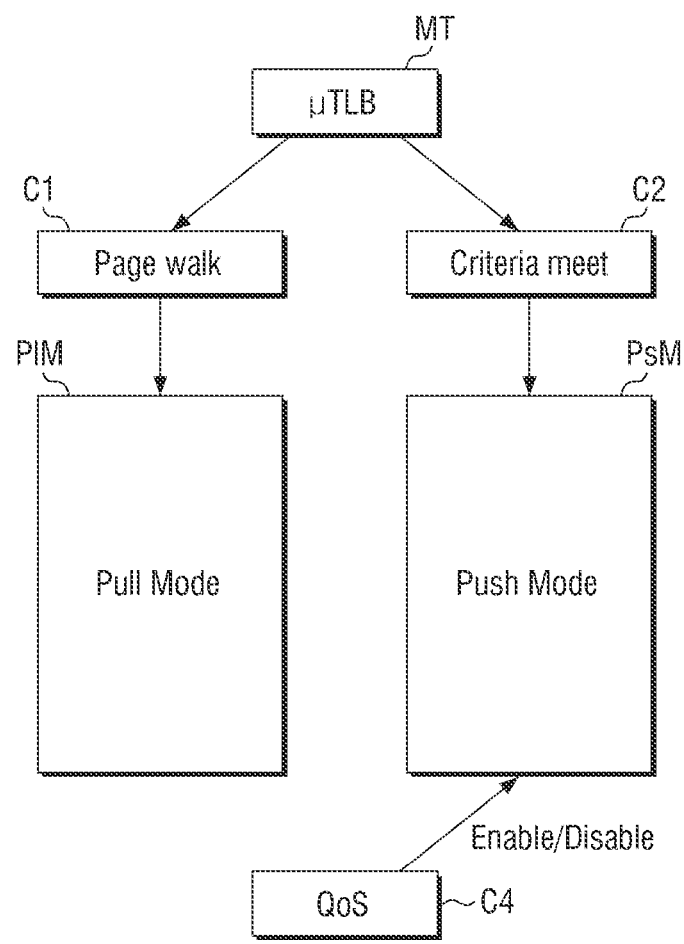
FIG. 26 is a conceptual diagram for illustrating operations of enabling and disabling a push mode of a micro TLB according to some embodiments of the disclosure.

FIG. 26 is a conceptual diagram for illustrating operations of enabling and disabling a push mode of the micro TLB according to some embodiments of the disclosure.

Referring to FIG. 26, enabling and disabling of the push mode PsM of the micro TLB MT may be determined according to a fourth condition C4. In the embodiment, at least one virtual machine may be implemented, and a separate user may be set for each virtual machine. These separate users may be set as subjects capable of performing different operations.

In some embodiments, priority of each user or virtual machine may be defined by quality of service (QOS). Accordingly, the push mode PsM may be enabled for a virtual machine having a high QoS requirement, that is, a high priority among several virtual machines. However, the push mode PsM is disabled for a virtual machine with a low priority, and thus, waste of resources of the neural processing device 1 according to the embodiment may be reduced.

The push mode PsM may increase a TLB hit probability to increase a processing speed, but additional resources may be required. Accordingly, the push mode PsM is enabled for a virtual machine with a high QoS requirement and the push mode PsM is disabled for a virtual machine with a low QoS requirement to increase efficiency of the entire device and accelerate the processing speed according to importance. Furthermore, optimization of given hardware may be performed through distribution of resources.

Figure 27:
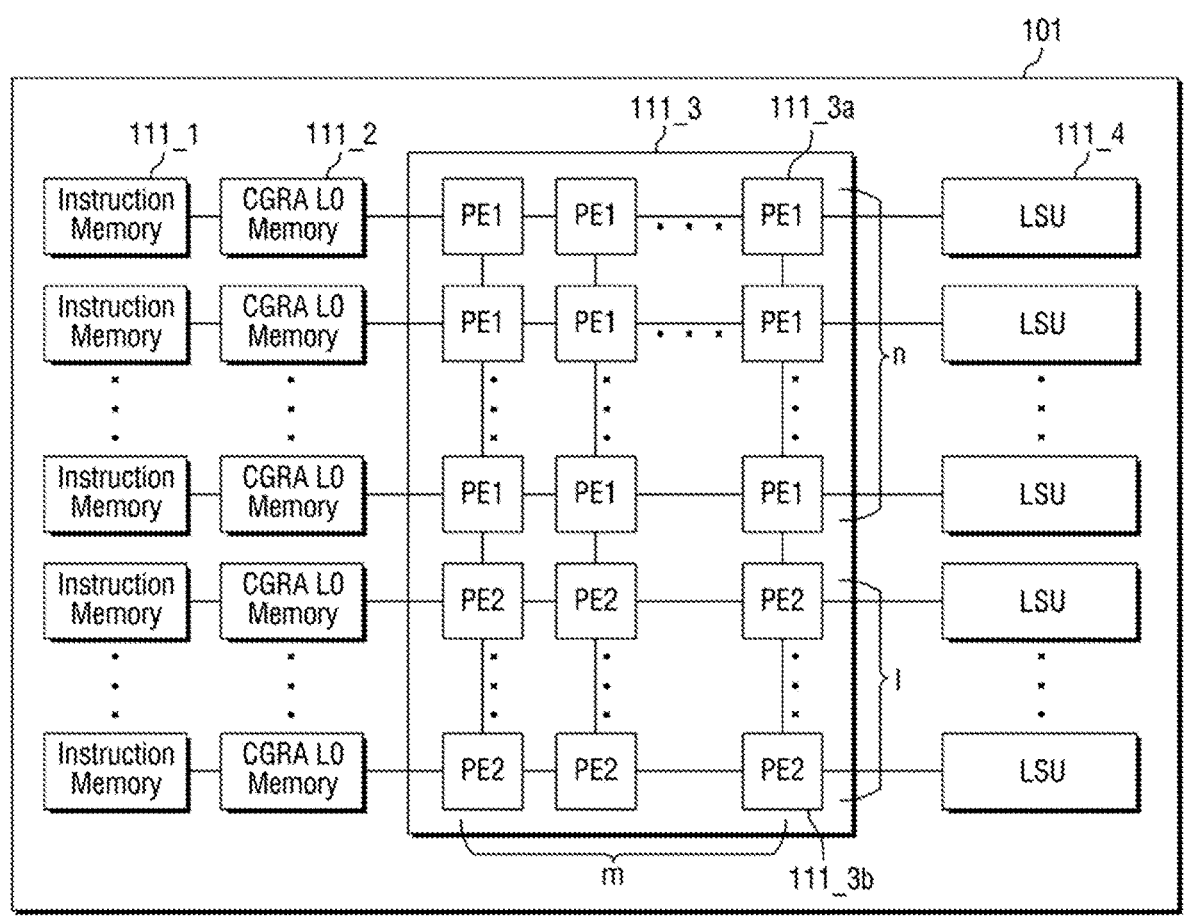
FIG. 27 is a block diagram for illustrating the structure of the neural processing device of FIG. 1 in detail.

FIG. 27 is a block diagram for illustrating in detail the structure of the neural processing device in accordance with some embodiments of the disclosure.

Referring to FIG. 27, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In some embodiments, the instructions may instruct the operation of first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In some embodiments, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in l rows. Accordingly, the first type of the plurality of processing elements 111_3a and the second type of the plurality of processing element 111_3b may be arranged in (n+1) rows and m columns.

The LSU 111_4 may receive at least one of data, a control signal, or a synchronization signal from the outside via the local interconnection 500. The LSU 111_4 may transmit at least one of the received data, control signal, or synchronization signal to the CGRA L0 memory 111_2. Similarly, the LSU 111_4 may transfer at least one of the data, control signal, or synchronization signal to the outside via the local interconnection 500.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In other words, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 28:
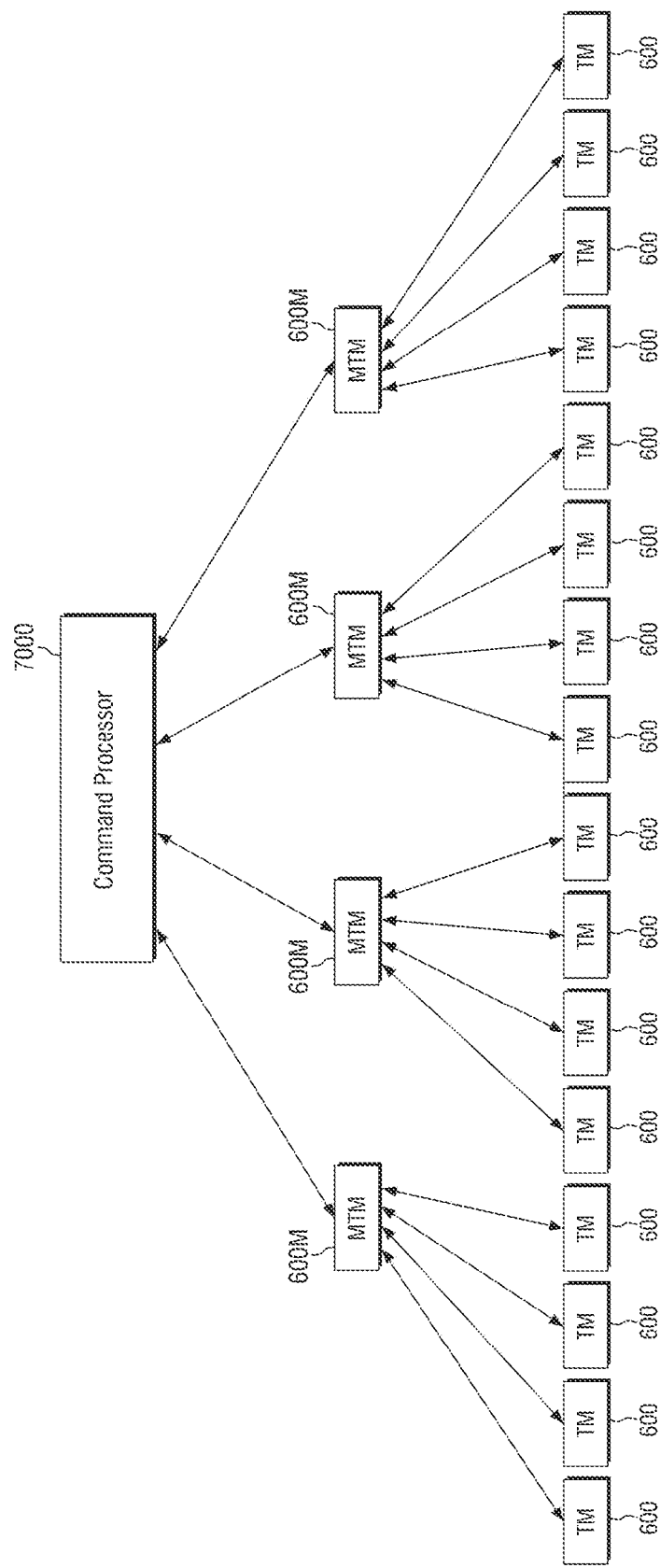
FIG. 28 is a diagram for illustrating a hierarchical structure of a command processor and task managers of a neural processing device in accordance with some embodiments of the disclosure.
Figure 29:
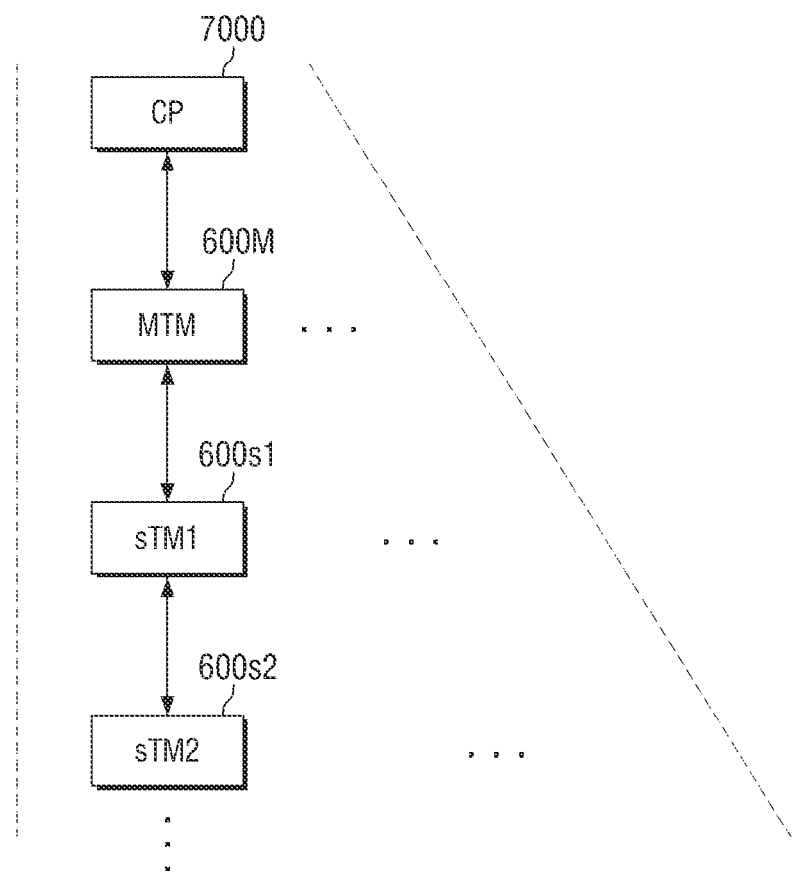
FIG. 29 is a diagram for illustrating a hierarchical structure of a command processor and task managers of a neural processing device in accordance with some embodiments of the disclosure.

FIG. 28 is a diagram for illustrating a hierarchical structure of a command processor and task managers of a neural processing device in accordance with some embodiments of the disclosure, and FIG. 29 is a diagram for illustrating a hierarchical structure of a command processor and task managers of a neural processing device in accordance with some embodiments of the disclosure.

Referring to FIGS. 28 and 29, if a number of task managers 600 increases, it may be difficult for the command processor 7000 to manage all of the task managers 600. Therefore, the neural processing device 1 in accordance with some embodiments of the disclosure may have a hierarchical structure in which each of master task managers 600M manages the plurality of task managers 600 and the command processor 7000 manages the master task managers 600M.

Further, referring to FIG. 29, levels below one of the master task manager 600M may also be subdivided into a plurality. For example, a first sub-task manager 600s1 and a second sub-task manager 600s2 may form each layer. In some embodiments, one first sub-task manager 600s1 may manage at least one second sub-task manager 600s2, and one master task manager 600M may manage at least one first sub-task manager 600s1. Additionally, several layers may be added below the second sub-task manager 600s2 as well.

In some embodiments, although three levels of the task manager 600, the master task manager 600M, and the command processor 7000 are shown in FIGS. 28 and 29, the number of levels may be four or more. In other words, the depth of the hierarchical structure may vary as desired depending on the number of task managers 600.

Figure 30:
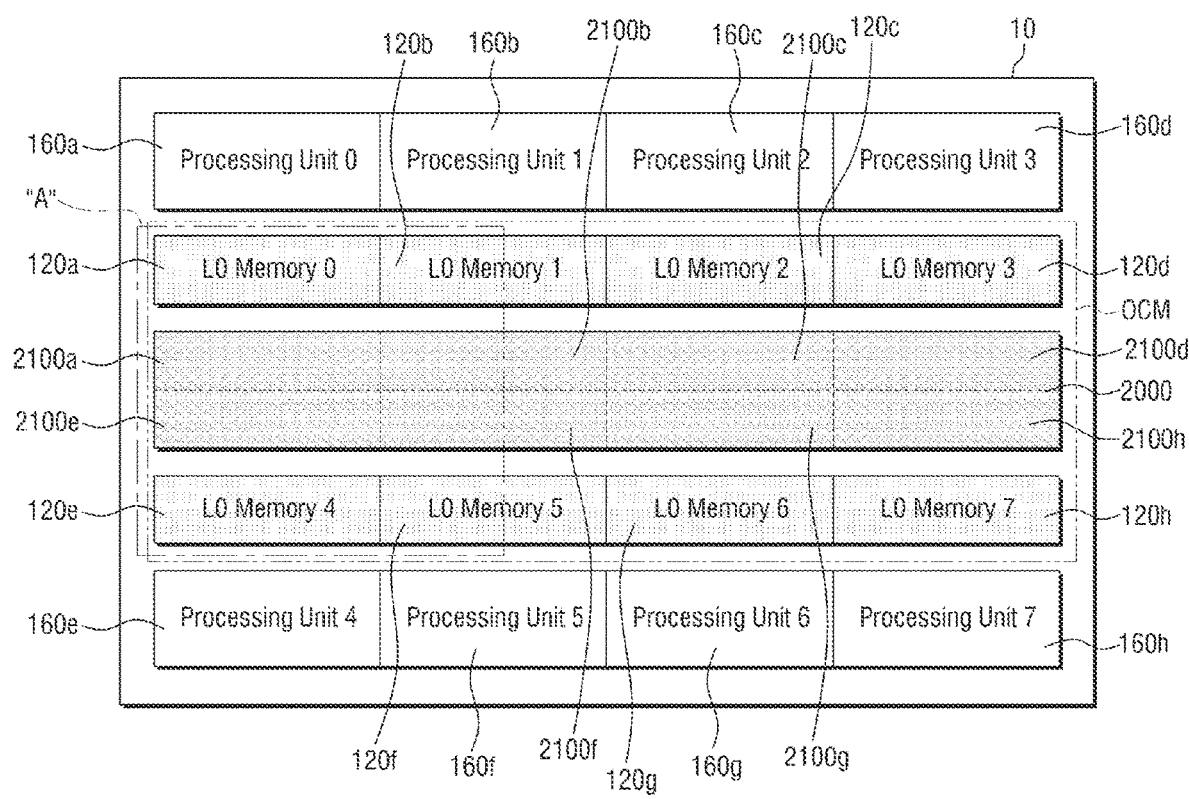
FIG. 30 is a block diagram for illustrating the memory reconstruction of the neural processing system in accordance with some embodiments of the disclosure.

FIG. 30 is a block diagram for illustrating memory reconfiguration of a neural processing system in accordance with some embodiments of the disclosure.

Referring to FIG. 30, the neural core SoC 10 may include first to eighth processing units 160a to 160h and an on-chip memory OCM. Although FIG. 30 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. In some embodiments, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In some embodiments, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In some embodiments, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 31:
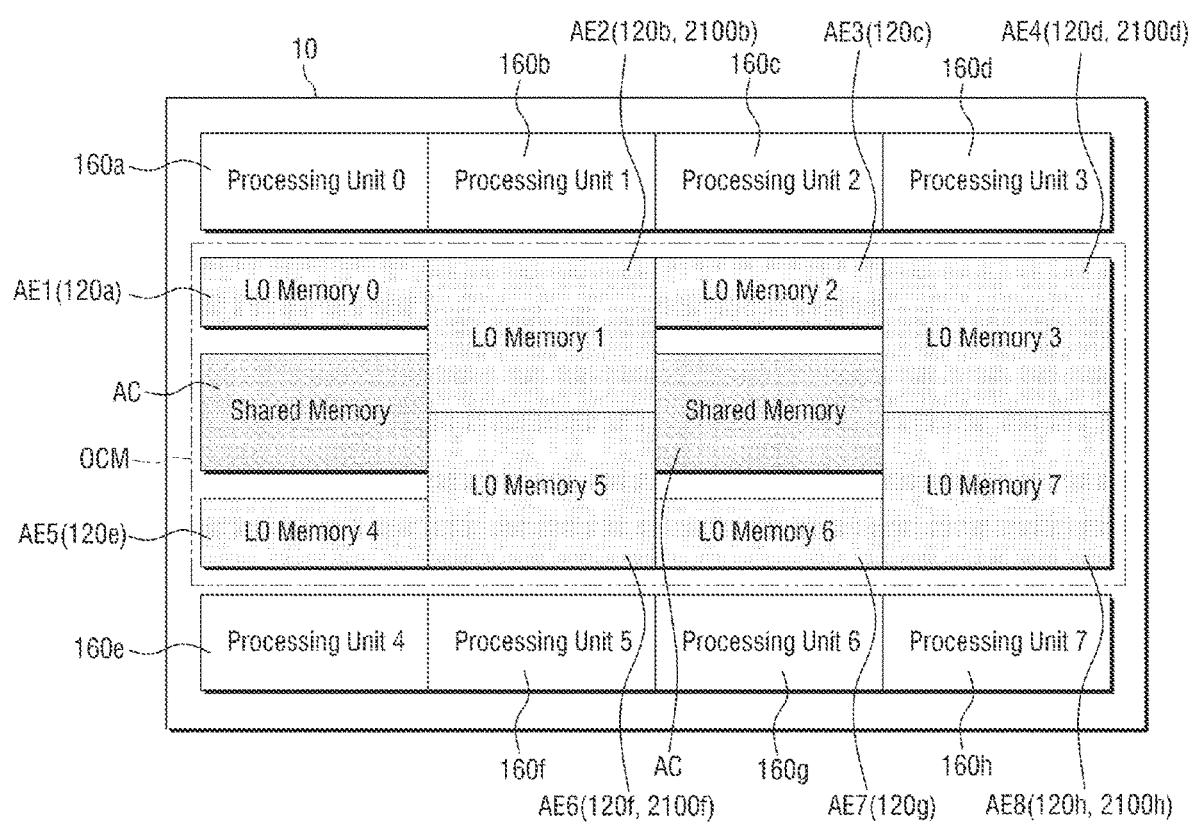
FIG. 31 is a block diagram for illustrating an example of the memory reconstruction of the neural processing system in accordance with some embodiments of the disclosure.

FIG. 31 is a block diagram showing an example of memory reconstruction of a neural processing system in accordance with some embodiments of the disclosure.

With reference to FIGS. 30 and 31, first, third, fifth, and seventh dedicated areas AE1, AE3, AE5, and AE7 for each of the first, third, fifth, and seventh processing units 160a. 160c. 160e, and 160g may include only the first, third, fifth, and seventh L0 memories 120a. 120c. 120e, and 120g, respectively. Further, second, fourth, sixth, and eighth dedicated areas AE2, AE4, AE6, and AE8 for cach of the second, fourth, sixth, and eighth processing units 160b. 160d. 160f, and 160h may include second, fourth, sixth, and eighth L0 memories 120b. 120d. 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 2100b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

In some embodiments, each processing unit may perform the same task in some cases, but may perform different tasks in other cases as well. In some embodiments, the amount of the L0 memory and the amount of the global memory required for the tasks carried out by cach processing unit are inevitably different each time. Accordingly, if the composition ratio of the L0 memory and the shared memory is fixedly set as in the conventional on-chip memory, there may occur inefficiency due to the calculation tasks assigned to cach processing unit.

Therefore, the shared memory 2000 of the neural processing device in accordance with the embodiment may set an optimal ratio of the L0 memory and the global memory according to computation tasks during the runtime, and may enhance the efficiency and speed of computation.

Figure 32:
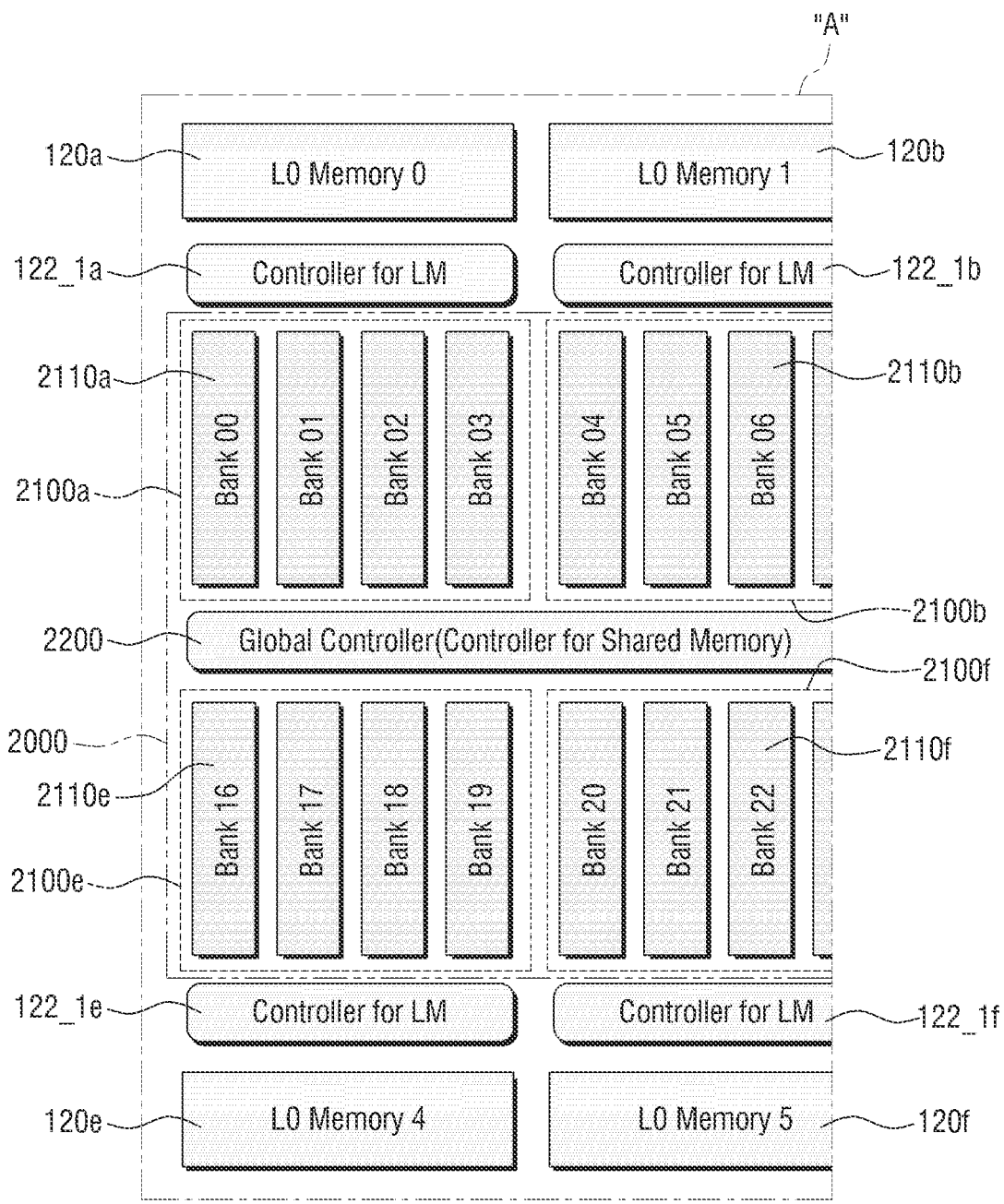
FIG. 32 is an enlarged block diagram of a portion A of FIG. 30.

FIG. 32 is an enlarged block diagram of a portion A of FIG. 30.

Referring to FIGS. 30 and 32, the shared memory 2000 may include a first L0 memory controller 122_1a, a second L0 memory controller 122_1b, a fifth L0 memory controller 122_1e, a sixth L0 memory controller 122_1f, first to eighth memory units 2100a to 2100h, and a global controller 2200. Other L0 memory controllers not illustrated in FIGS. 30 and 32 may also be included in the embodiment, and descriptions thereof are omitted for the sake of convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, the first L0 memory controller 122_1a, the second L0 memory controller 122_1b, the fifth L0 memory controller 122_1e, the sixth L0 memory controller 122_1f, and the global controller 2200 may each be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a. 122_1b. 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively.

Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment Is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 32 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In some embodiments, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In some embodiments, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In some embodiments, the third area and the fourth area do not necessarily coexist, and any one area may take up the entire first memory unit 2100a.

In some embodiments, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 33:
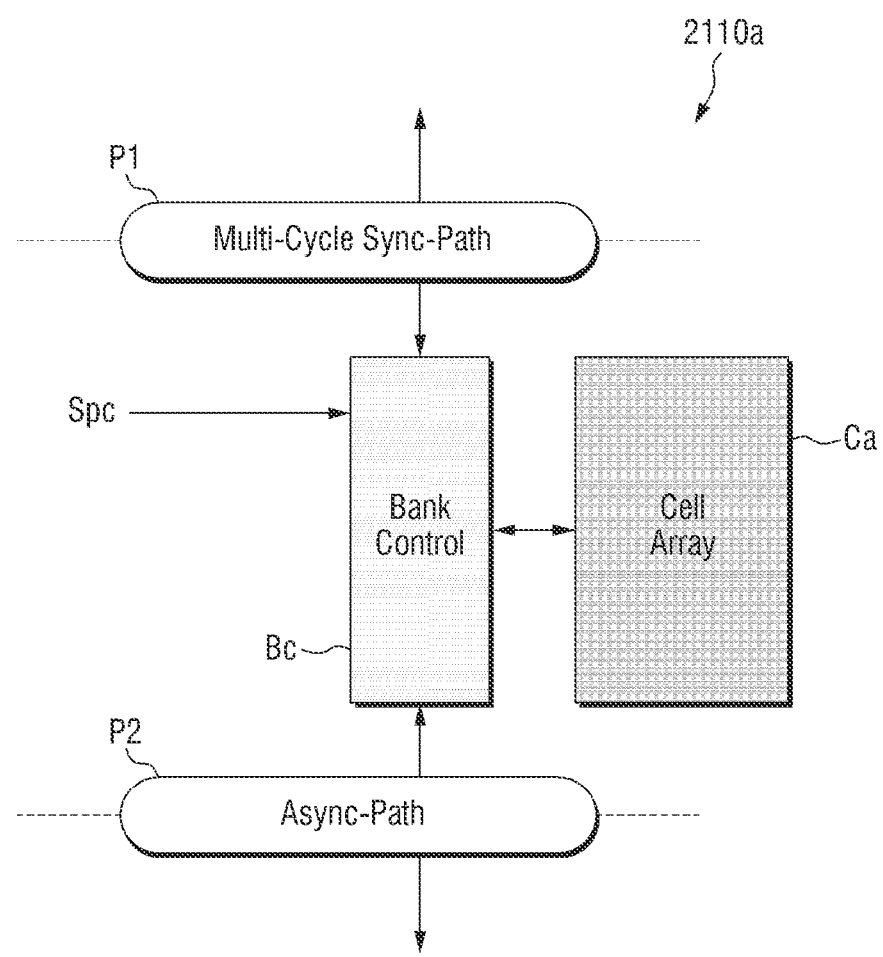
FIG. 33 is a diagram for illustrating the first memory bank of FIG. 32 in detail.

FIG. 33 is a diagram for illustrating the first memory bank of FIG. 32 in detail. Although FIG. 33 illustrates the first memory bank 2110a, other memory banks may also have the same structure as the first memory bank 2110a.

Referring to FIG. 33, the first memory bank 2110a may include a cell array Ca, a bank controller Bc, a first path unit P1, and a second path unit P2.

In some embodiments, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, the bank controller Bc, the first path unit P1, and the second path unit P2 may each be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In some embodiments, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In some embodiments, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 28.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In some embodiments, the operating clock frequency of the first path unit P1 may be multiples of the operating clock frequency of the bank controller Bc. In some embodiments, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 33, an operating clock frequency of the first path unit P1 may be 1.5 GHZ, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In some embodiments, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 28.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 33, the operating clock frequency of the second path unit P2 may not be synchronized with the operating clock frequency of the bank controller Bc. In some embodiments, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In other words, the bank controller Bc may use a first address system if exchanging data via the first path unit P1 and a second address system if exchanging data via the second path unit P2. In some embodiments, the first address system and the second address system may be different from each other.

A bank controller Be is not necessarily required for each memory bank. In other words, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Be may exist for each memory bank. In some embodiments, the bank controller Bc may control each memory bank individually.

Referring to FIG. 32 and FIG. 33, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In some embodiments, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 33, the operating clock frequency of the second path unit P2 may operate at 1 GHZ, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHZ) and a global interconnection (e.g., 1 GHZ) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units uses one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 34:
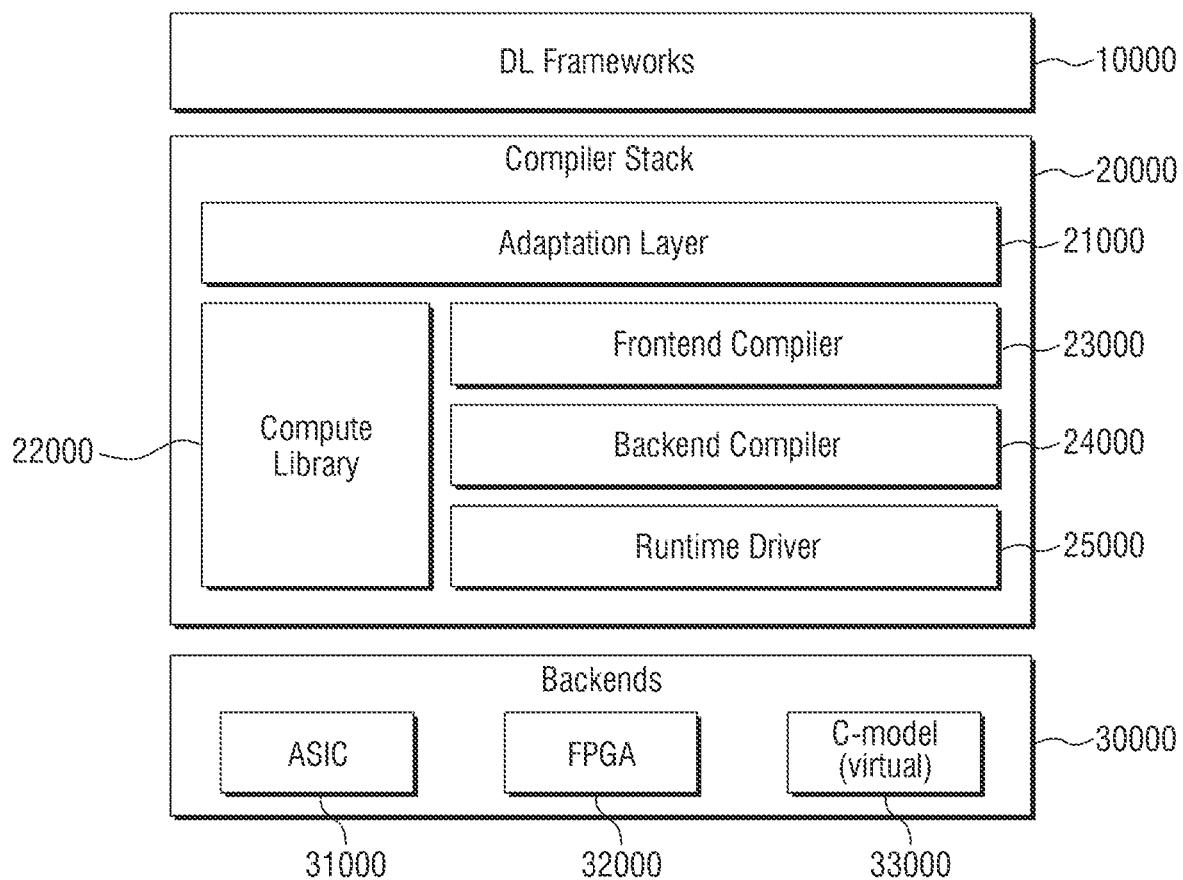
FIG. 34 is a block diagram for illustrating a software hierarchy of a neural processing device in accordance with some embodiments of the disclosure.

FIG. 34 is a block diagram for illustrating a software hierarchy of a neural processing device in accordance with some embodiments.

Referring to FIG. 34, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 35:
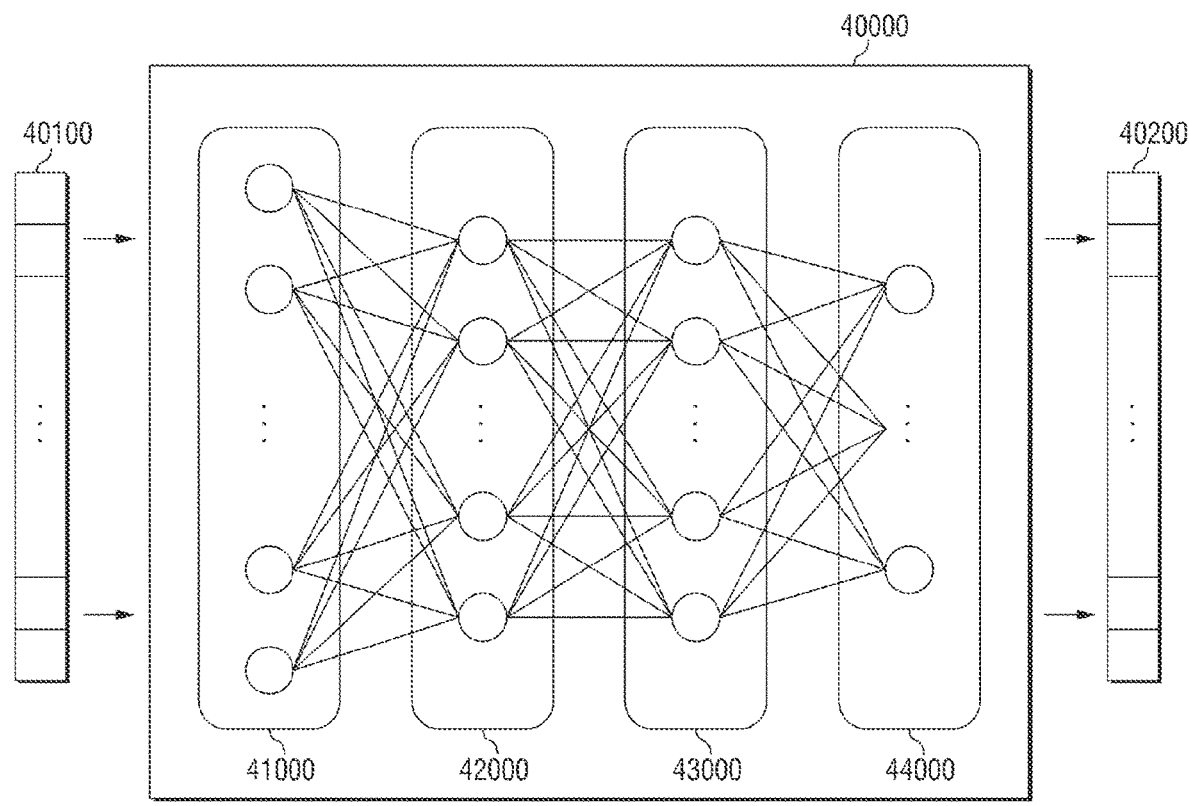
FIG. 35 is a conceptual diagram for illustrating deep learning calculations performed by a neural processing device in accordance with some embodiments of the disclosure.

FIG. 35 is a conceptual diagram for illustrating deep learning calculations performed by a neural processing device in accordance with some embodiments.

Referring to FIG. 35, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 31, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 36:
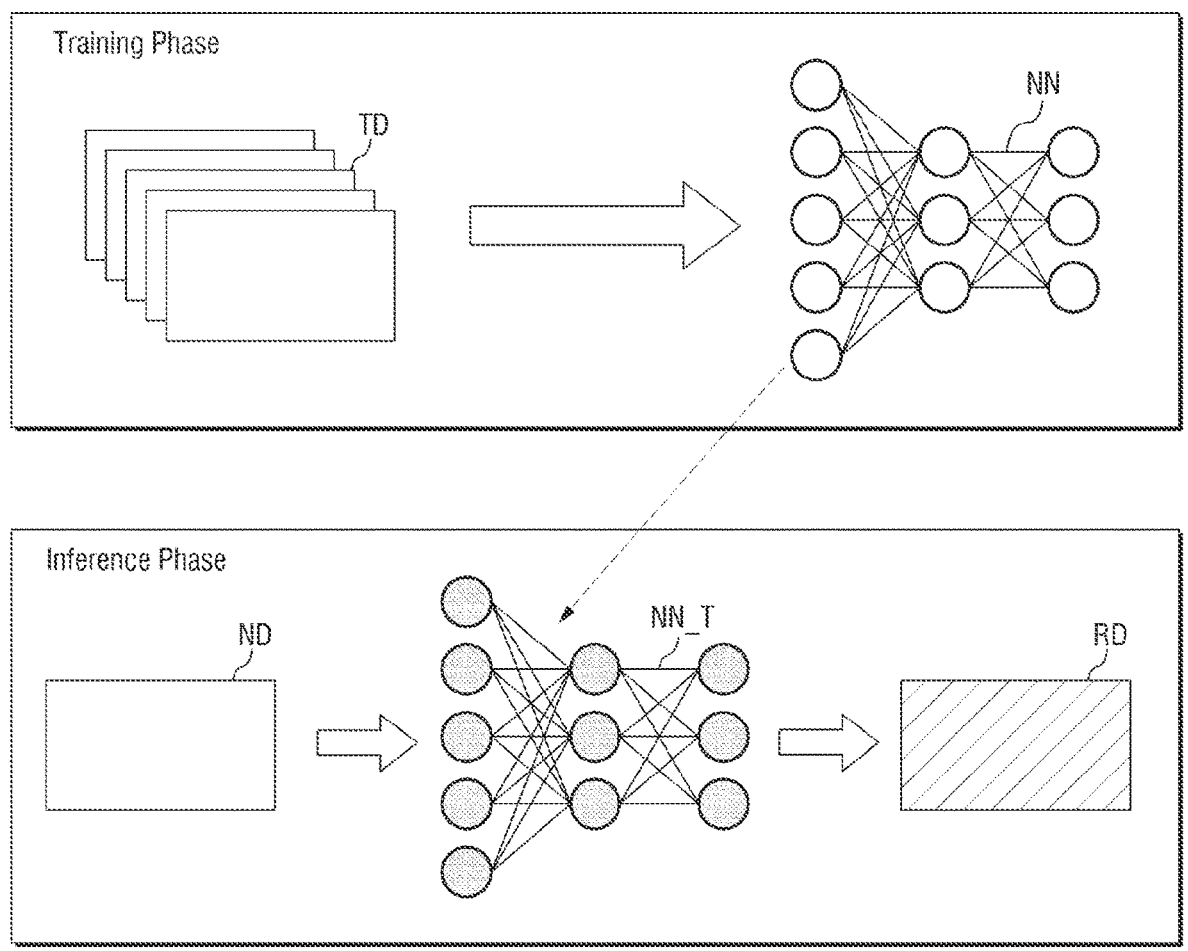
FIG. 36 is a conceptual diagram for illustrating training and inference operations of a neural network of a neural processing device in accordance with some embodiments of the disclosure.

FIG. 36 is a conceptual diagram for illustrating training and inference operations of a neural network of a neural processing device in accordance with some embodiments.

Referring to FIG. 36, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a method of updating TLB of a neural processing device according to some embodiments of the disclosure will be described with reference to FIG. 19 and FIGS. 37 to 39. Descriptions that are identical to or similar to those described above will be omitted or simplified.

Figure 37:
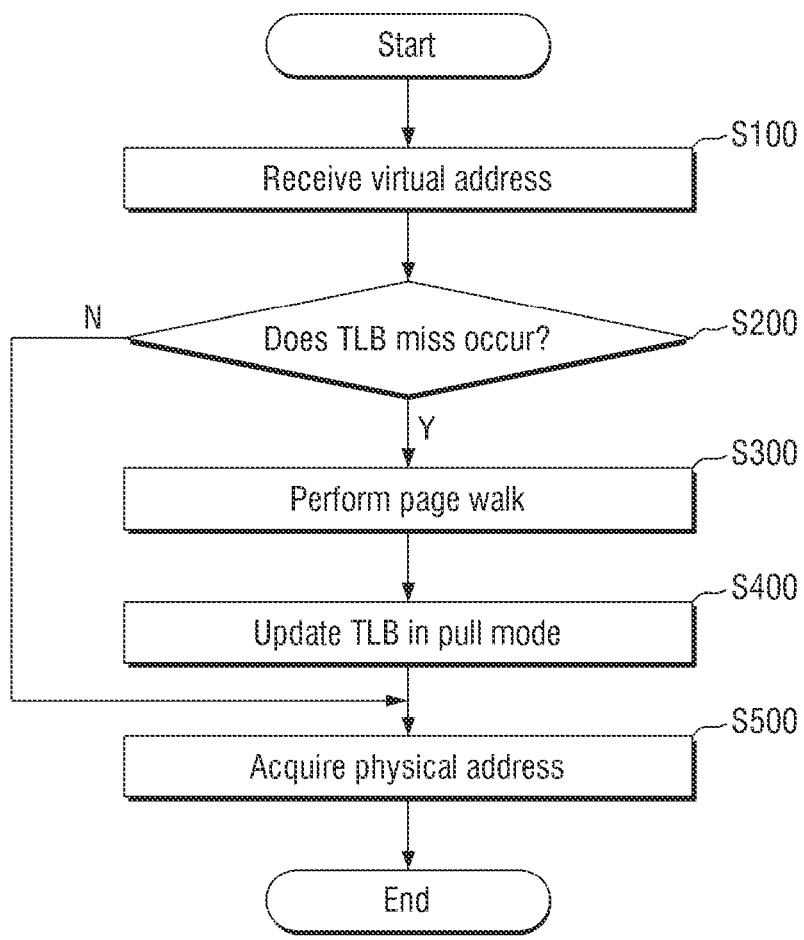
FIG. 37 is a flowchart for illustrating a method of updating TLB of a neural processing device in a pull mode according to some embodiments of the disclosure.

FIG. 37 is a flowchart for illustrating a method of updating TLB of a neural processing device in a pull mode according to some embodiments of the disclosure.

Referring to FIG. 37, a virtual address is received at S100 and TLB miss is determined at S200.

Specifically, referring to FIG. 19, when cach micro TLB MT receives a virtual address according to an instruction or a task descriptor, the micro TLB MT may check whether the received virtual address is stored in the micro TLB MT. In some embodiments, when a virtual address is stored in the micro TLB MT, TLB hit occurs, and the virtual address is translated into a physical address corresponding thereto to quickly perform an operation.

Referring again to FIG. 37, when the TLB hit occurs, a physical address is immediately acquired at S500. On the other hand, when TLB miss occurs, a page walk is performed at S300.

Specifically, referring to FIG. 19, when the virtual address is not stored in the micro TLB MT, the TLB miss may occur. In some embodiments, the page walk may be performed to translate a virtual address into a physical address. The page walk may be an operation of accessing a memory in which a page table is stored and acquiring a physical address for a necessary virtual address. Again, referring to FIG. 37. TLB is updated in a pull mode at S400.

Specifically, referring to FIG. 19, the micro TLB MT may be updated in the pull mode. A pull mode update may be performed internally and automatically by the micro TLB MT. The pull mode update may be performed by a general TLB and may be performed along with a page walk. Referring again to FIG. 37, a physical address is acquired at S500.

Figure 38:
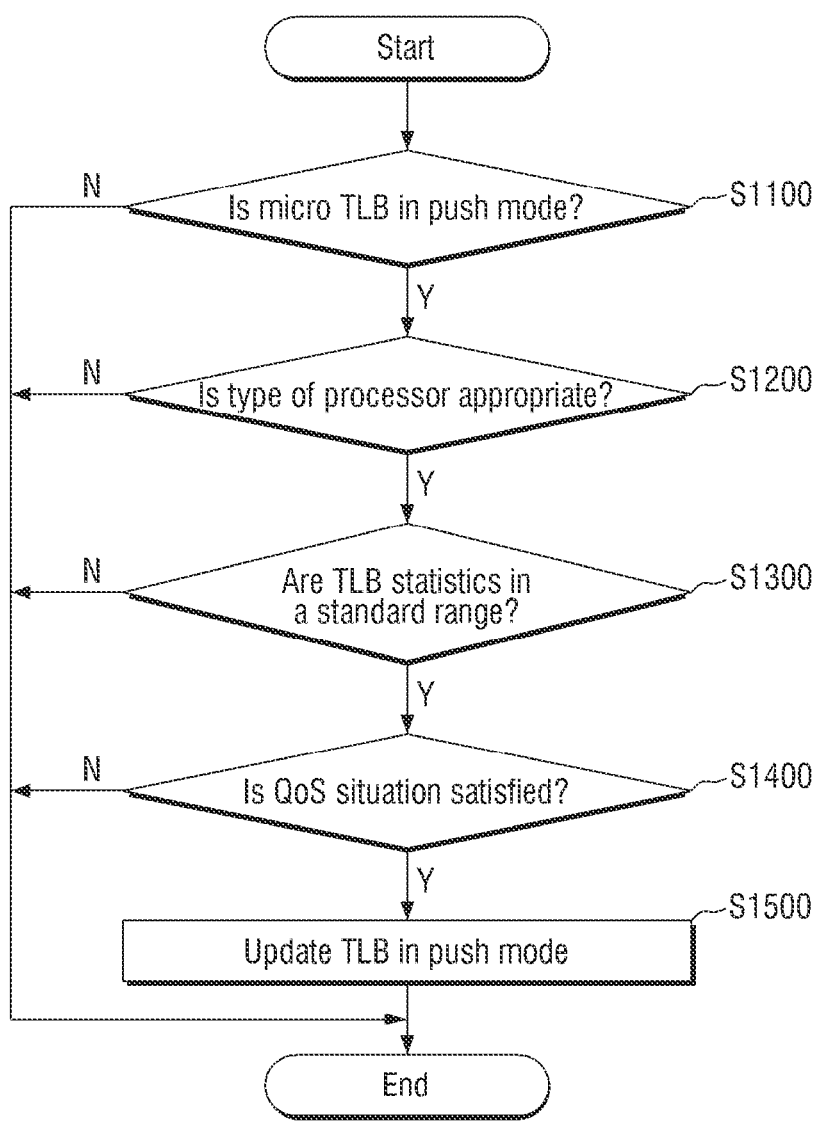
FIG. 38 is a flowchart for illustrating a method of updating TLB of a neural processing device according to some embodiments of the disclosure.

FIG. 38 is a flowchart for illustrating a method of updating TLB of a neural processing device according to some embodiments of the disclosure.

Referring to FIG. 38, it is first determined whether a mode of micro TLB is the push mode S1100. When the mode is not the push mode, the processing ends. On the other hand, when the mode is the push mode, it is determined whether the processor type is appropriate at S1200. In some embodiments, it is determined whether the processor is a general-purpose processor, such as a CPU, or a specific-purpose processor, such as a neural processor. When the processor is the general-purpose processor that is not appropriate, the push mode ends. On the other hand, when the processor is an appropriate type, it is determined whether the TLB statistics are in a standard range at S1300. In some embodiments, how frequently the micro TLB is accessed may be referred to as the TLB statistics.

Specifically, referring to FIG. 19, the push mode may be disabled depending on circumstances. In some embodiments, when statistic values of the micro TLB MT are calculated for cach neural processor 1000, the micro TLB MT may be updated in the pull mode rather than the push mode according to the statics values. For example, when the TLB miss is greater than a reference value, the push mode may be disabled.

Referring again to FIG. 38, it is determined whether a QoS requirement is in a reference range at S1400. When the QoS requirement is outside the reference range, the push mode ends. On the other hand, when the QoS requirement is within the reference range. TLB update is performed in the push mode at S1500.

Specifically, referring to FIG. 19, in the embodiment, settings of the push mode and the pull mode may be changed for each virtual machine in the process of operating multiple virtual machines. For example, a virtual machine with a high priority according to each virtual machin"s quality of service (QOS) requirement operates in the push mode, and a virtual machine with a low priority operates in the pull mode, and thus, waste of resources according to the push mode may be minimized.

Figure 39:
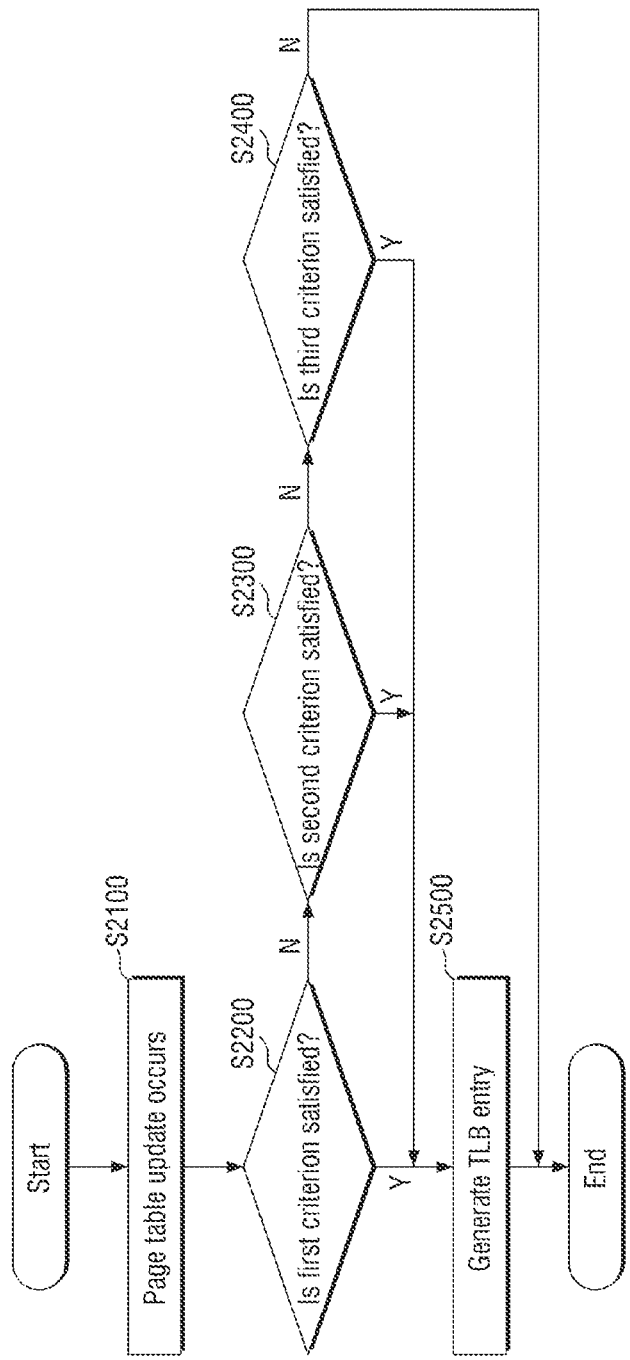
FIG. 39 is a flowchart for illustrating a method of generating TLB entry of a neural processing device according to some embodiments of the disclosure.

FIG. 39 is a flowchart for illustrating a method of generating TLB entry of a neural processing device according to some embodiments of the disclosure.

Referring to FIG. 39, a page table update occurs at S2100. Subsequently, it is determined whether a first criterion to a third criterion are satisfied at S2200 to S2400. When any one of the three criteria is satisfied, a TLB entry is generated at S2500. Although FIG. 39 sequentially illustrates determination steps S2200 to S2400 of the first criterion to the third criterion, the embodiment is not limited thereto. In some embodiments, the first criterion to the third criterion may be determined in a different order or simultaneously.

In some embodiments, the generated TLB entry may be a previously generated pre-generation TLB entry. Accordingly, the TLB may be updated by the pre-generation TLB entry when TLB is updated in the push mode later.

Of course, unlike this, the micro TLB MT may directly update on-the-fly, that is, without pre-generation.

Figure 40:
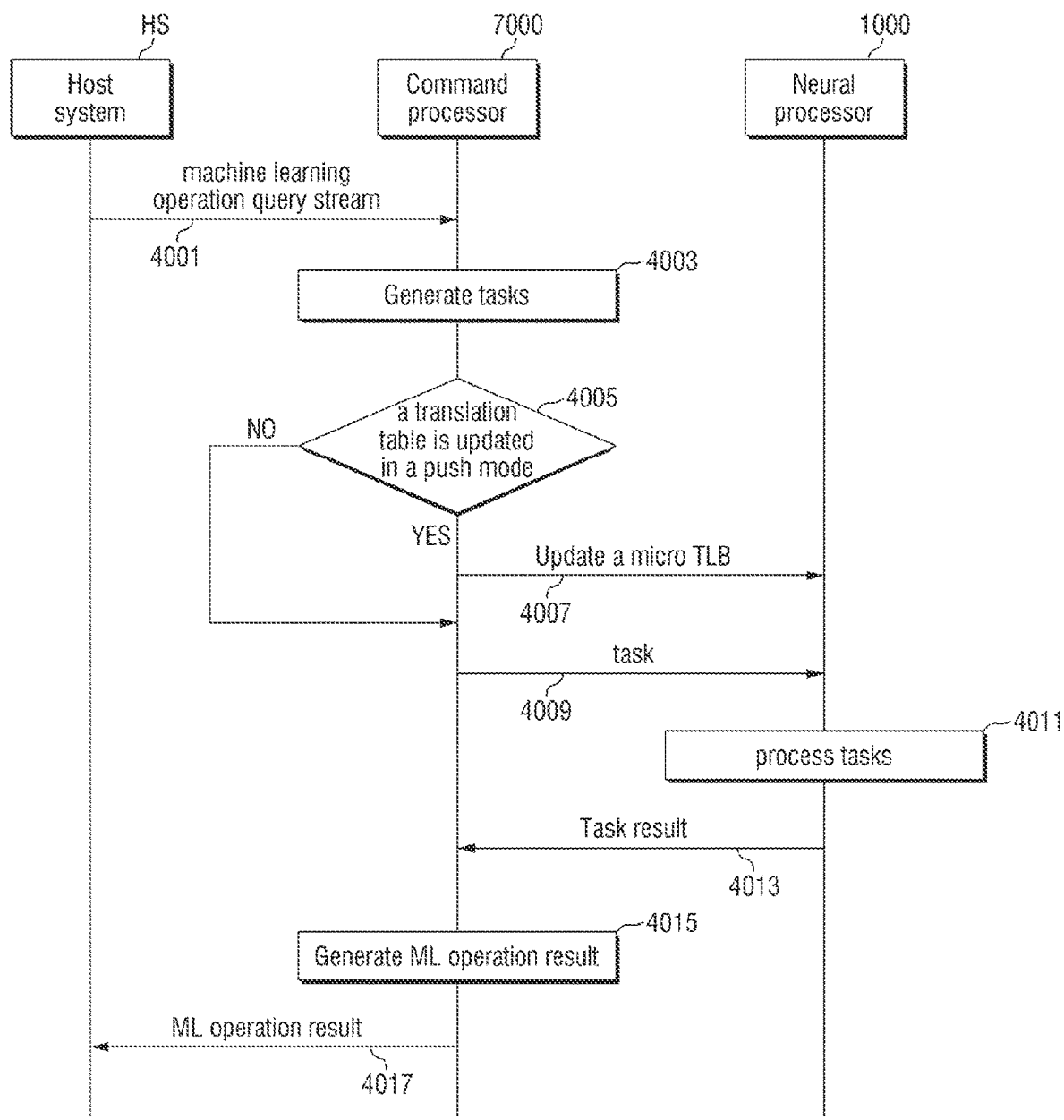
FIG. 40 is a ladder diagram for illustrating operations of the command processor in connection with the host system and the neural processor.

FIG. 40 is a ladder diagram for illustrating operations of the command processor in connection with the host system and the neural processor.

As shown in FIG. 40, at 4001, the host system HS may transmit one or more machine learning operation query stream including one or more command descriptors and data for a machine learning operation of a machine learning model. A machine learning operation with a single query stream may be referred to as a single stream machine learning operation and a machine learning operation with two or more query streams at a time may be referred to as a multi-stream machine learning operation. In some embodiments, the artificial intelligence operation may be an artificial intelligence training operation and may be an artificial intelligence inference operation. In some embodiments, the data for the machine learning operation may include trained machine learning model parameters when the machine learning operation is the AI inference operation. In some embodiments, the command descriptor may contain a control sequence specifying how tasks are assigned to the plurality of the neural processors 1000, how to use data for the machine learning operation, and how to access the trained data.

In some embodiments, before the host system HS transmits the machine learning operation query stream, the host system HS may determine whether the memory region to be accessed by the task to be assigned to the neural processor 1000 is a memory region storing a command descriptor. When the memory region to be accessed by the task to be assigned to the neural processor 1000 is a memory region storing a command descriptor, the command processor 7000 may determine that a translation table of a micro TLB MT of the neural processor 1000 is updated in the push mode for the memory region storing the command descriptor; otherwise, if other conditions for the push mode is not satisfied, the command processor 7000 may determine that a translation table of the micro TLB MT is not updated for the memory region.

At 4003, the command processor 7000 may generate tasks to be assigned to the plurality of the neural processors 1000 based on the received command descriptors.

At 4005, the command processor 7000 may determine, based on a characteristic of the task, whether a translation table is updated in a push mode for a micro TLB MT of a neural processor 1000 which a task is assigned to. In some embodiments, the command processor 7000 may determine it adaptively during the machine learning operation.

In some embodiments, the characteristic of the task comprises at least one of a type of a layer associated with the task, a number of query streams of the machine learning operation associated with the task, or a type of a memory accessed by the task. In some embodiments, the type of the layer associated with the task may represent whether the task is associated with a next layer of a current layer of the machine learning model. In some embodiments, the type of the layer associated with the task may represent whether the task is associated with a front layer of the machine learning model. In some embodiments, the type of the memory accessed by the task may represent whether the task accesses a memory located within the neural processor 1000. In some embodiments, the type of the memory accessed by the task may represent whether the task accesses a read-only sharable memory region which is shared by a plurality of processors. In some embodiments, the type of the memory accessed by the task may represent whether the task accesses a memory region for backing up a register file. In some embodiments, the type of the memory accessed by the task may represent whether the task accesses a memory region for register spilling. In some embodiments, the type of the memory accessed by the task may represent whether the task accesses a memory region whose size is less than a threshold size and whose access frequency is greater than a threshold frequency. In some embodiments, the type of the memory accessed by the task may represent whether the task accesses a memory region storing a memory mapped file.

In some embodiments, the command processor 7000 may have any combination comprising one or more conditions of the following:
   i) whether the task is associated with a next layer of a current layer of the machine learning model;
   ii) whether the task is associated with a front layer of the machine learning model;
   iii) whether the task accesses a memory located within the neural processor 1000;
   iv) whether the task accesses a read-only sharable memory region which is shared by a plurality of processors;
   v) whether the task accesses a memory region for backing up a register file;
   vi) whether the task accesses a memory region for register spilling;
   vii) whether the task accesses a memory region whose size is less than a threshold size and whose access frequency is greater than a threshold frequency;
   viii) whether the task accesses a memory region storing a memory mapped file; and
   ix) other condition.

In some embodiments, the command processor 7000 may determine that the translation table is updated in the push mode if any condition in the combination is satisfied; otherwise the command processor 7000 may determine that the translation table is not updated in the push mode. For example, in case that the combination has the conditions i) and iii), the command processor 7000 may determine that the translation table is updated in the push mode if the task is associated with the next layer or if the task accesses a memory located within the neural processor 1000; if the task is not associated with the next layer of a current layer of the machine learning model and the task does not access a memory located within the neural processor 1000, the command processor 7000 may determine that the translation table is not updated in the push mode.

In some embodiments, the command processor 7000 may determine whether a task to be assigned to a neural processor 1000 is for a next layer of a current layer of a machine learning model. When the command processor 7000 may determine that the task is for the next layer, the command processor 7000 may determine that a translation table is updated in the push mode for a micro TLB MT of the neural processor 1000 which the task is assigned to. Otherwise, if other conditions for the push mode are not satisfied, the command processor 7000 may determine that a translation table is not updated in the push mode for the micro TLB MT. This may make the latency reduced by updating the micro TLB MT in advance before assigning the task, and thereby the required QoS may be guaranteed.

In some embodiments, the command processor 7000 may determine whether a task to be assigned to a neural processor 1000 is for a front layer of a machine learning model. When the command processor 7000 may determine that the task is for the front layer, the command processor 7000 may determine that a translation table is updated in the push mode for a micro TLB MT of the neural processor 1000 which the task is assigned to. Otherwise, if other conditions for the push mode are not satisfied, the command processor 7000 may determine that a translation table is not updated in the push mode for the micro TLB MT. This may make the latency reduced by updating the micro TLB MT in advance before assigning the task, and thereby the required QoS may be guaranteed.

In some embodiments, the command processor 7000 may determine whether the task to be assigned to the neural processor 1000 is for a single stream machine learning operation including a single stream AI training operation and a single stream AI inference operation. In some embodiments, the command processor 7000 determines whether the task to be assigned to the neural processor 1000 is for a single stream AI inference. In some embodiments, when the command processor 7000 determines that the task is for a single stream machine learning operation, the command processor 7000 may determine that a translation table is updated in the push mode for a micro TLB MT of the neural processor 1000 which the task is assigned to; otherwise, if the task is for a multi-stream machine learning operation and if other conditions for the push mode are not satisfied, the command processor 7000 may determine that a translation table is not updated in the push mode for the micro TLB MT. In some embodiments, when the command processor 7000 determines that the task is for a single stream AI inference, the command processor 7000 may determine that a translation table is updated in the push mode for a micro TLB MT of the neural processor 1000 which the task is assigned to; otherwise, if the task is for a multi-stream AI inference and if other conditions for the push mode are not satisfied, the command processor 7000 may determine that a translation table is not updated in the push mode for the micro TLB MT. This may make the latency reduced by updating the micro TLB MT in advance before assigning the task, and performance required by the single stream machine learning operation may be achieved.

In some embodiments, the command processor 7000 may determine whether the task to be assigned to the neural processor 1000 accesses a memory located within the neural processor 1000. When the task accesses a memory located within the neural processor 1000, the command processor 7000 may determine that a translation table of a micro TLB MT of the neural processor 1000 is updated in the push mode for the memory located within the neural processor 1000; otherwise, if other conditions for the push mode are not satisfied, the command processor 7000 may determine that a translation table is not updated in the push mode for the micro TLB MT. This may make the latency reduced by updating the micro TLB MT in advance before assigning the task, and thereby performance of the task accessing the latency-sensitive memory region may be achieved.

In some embodiments, the command processor 7000 may determine whether the task to be assigned to the neural processor 1000 accesses a memory for peer to peer (P2P) data access outside the neural processing device 1 including the neural processor 1000. In some embodiments, the P2P data access may be data access between the neural processing device including the neural processing device 1 and the host system HS and the memory for P2P data access outside the neural processing device 1 may be a memory within the host system HS. When the task accesses a memory located within the host system HS, the command processor 7000 may determine that a translation table of a micro TLB MT of the neural processor 1000 is updated in the push mode for the memory located outside the neural processing device 1 and within the host system HS; otherwise, if other conditions for the push mode are not satisfied, the command processor 7000 may determine that a translation table of the micro TLB MT is not updated in the push mode. This may make the latency reduced by updating the micro TLB MT in advance before assigning the task, and thereby performance of the task accessing a latency-sensitive memory region may be achieved.

In some embodiments, the command processor 7000 may determine whether the task to be assigned to the neural processor 1000 accesses a read-only sharable memory region. In some embodiments, the memory modules described above may include a sharable memory region which the plurality of the neural processors 1000 shares. The sharable memory region may include a read-only sharable memory region and a writable sharable memory region. The plurality of neural processors 1000 may be not allowed to modify data in the read-only sharable memory region and may be only allowed to read data in the read-only sharable memory region. Other processors than the plurality of neural processors 1000 like the host system HS may be allowed to modify data in the read-only sharable memory region. In some embodiments, when the task accesses the read-only sharable memory region, the command processor 7000 may determine that a translation table of a micro TLB MT of the neural processor 1000 is updated in the push mode for the read-only sharable memory region; otherwise, if the task accesses the writable sharable memory region and if other conditions for the push mode are not satisfied, the command processor 7000 may determine that a translation table of the micro TLB MT is not updated in the push mode for the writable sharable memory region. This may make the latency reduced by updating the micro TLB MT in advance before assigning the task, and thereby performance of the task accessing a latency-sensitive memory region may be achieved.

In some embodiments, the command processor 7000 may determine whether the task to be assigned to the neural processor 1000 accesses a memory region for backing up a register file or a memory region for register spilling. In some embodiments, when the task to be assigned to the neural processor 1000 accesses the memory region for backing up a register file or the memory region for register spilling, the command processor 7000 may determine that a translation table of a micro TLB MT of the neural processor 1000 is updated in the push mode for the memory region for backing up a register file or the memory region for register spilling. This may make the latency reduced by updating the micro TLB MT in advance before assigning the task, and performance of the task accessing a latency-sensitive memory region may be achieved.

In some embodiments, the command processor 7000 may determine whether a memory region to be accessed by the task to be assigned to the neural processor 1000 is a memory region whose size is less than a threshold size and whose access frequency is greater than a threshold frequency. For example, the threshold size may be 4 KB or 64 KB and the threshold frequency may be ten times per unit time. In some embodiments, when the memory region to be accessed by the task to be assigned to the neural processor 1000 is the memory region whose size is less than the threshold size and whose access frequency is greater than the threshold frequency, the command processor 7000 may determine that a translation table of a micro TLB MT of the neural processor 1000 is updated in the push mode for the memory region; otherwise, if other conditions for the push mode are not satisfied, the command processor 7000 may determine that a translation table of the micro TLB MT is not updated for the memory region. This may make the latency reduced by updating the micro TLB MT in advance before assigning the task, and performance of the task accessing a latency-sensitive memory region may be achieved.

In some embodiments, the command processor 7000 may determine whether the memory region to be accessed by the task to be assigned to the neural processor 1000 is a memory region storing a memory mapped file. When the memory region to be accessed by the task to be assigned to the neural processor 1000 is a memory region storing a memory mapped file, the command processor 7000 may determine that a translation table of a micro TLB MT of the neural processor 1000 is updated in the push mode for the memory region storing the memory mapped file; otherwise, if other conditions for the push mode are not satisfied, the command processor 7000 may determine that a translation table of the micro TLB MT is not updated for the memory region. This may make the latency reduced by updating the micro TLB MT in advance before assigning the task, and thereby performance of the task accessing a latency-sensitive memory region may be achieved.

In some embodiments, the command processor 7000 may determine whether a quality of service (QOS) level for the machine learning operation for a user is higher than a threshold QoS. In some embodiments, when the QoS level for the machine learning operation for the user is higher than the threshold QoS, the command processor 7000 may determine that a translation table of a micro TLB MT of the neural processor 1000 is updated in the push mode. This may make the latency reduced by updating the micro TLB MT in advance before assigning the task, and thereby the required QoS may be guaranteed.

If the command processor 7000 may determine that a translation table is updated in a push mode for the micro TLB MT of the neural processor 1000, the command processor 7000 may push the translation table into the micro TBL MT of the neural processor 1000 before assigning the task to the neural processor 1000 at 4007 and assign the task to the neural processor 1000 at 4009.

If the command processor 7000 may determine that a translation table is not updated in a push mode for the micro TLB MT of the neural processor 1000, the command processor 7000 may assign the task to the neural processor 1000 without pushing the translation table into the micro TBL MT of the neural processor 1000 at 4009.

The neural processor 1000 may process the task to generate a task processing result at 4011. In some embodiments, the neural processor 1000 may acquire a physical address as described in FIG. 37.

The neural processing device 1 may perform an inference or a training of the machine learning model based on task processing results from the plurality of the neural processors 1000. For example, at 4013, the neural processor 1000 may transmit the task processing result to the command processor 7000. At 4015, the command processor 7000 may generate a machine learning operation result of the machine learning model based on task processing results from the plurality of the neural processors 1000. At 4017, the command processor 7000 may transmit the machine learning operation result to the host system HS. In some embodiments, the machine learning operation result may be an inference result or a training result of the machine learning model.

In some embodiments, blocks, units, modules, and components as describe above may be implemented as a circuit or circuitry. Blocks, units, modules, and components which perform processing may be referred to as a processor, a processing circuit, a processor circuit, or a processing circuitry. Blocks, units, modules, and components which store data may be referred to as a memory, a memory circuit, or a memory circuitry.

Hereinafter, various aspects will be described.

In some aspects, a processing device including circuitry to cause: generating a task for a machine learning operation of a machine learning model to be assigned to processing circuitry; determining, based on a characteristic of the task, whether a translation table is updated in a push mode for a translation memory of the processing circuitry, wherein the translation table specifies relationship between virtual memory addresses and physical memory addresses; in response to a determination that the translation table is updated in the push mode, pushing the translation table into the translation memory of the processing circuitry before assigning the task to the processing circuitry; and in response to a determination that the translation table is not updated in the push mode, assigning the task to the processing circuitry without pushing the translation table into the translation memory of the processing circuitry. The processing circuitry is configured to process the task based on the translation table in the translation memory to generate an output. The processing device processes the machine learning operation of the machine learning model based on the output from the plurality of the processing circuitry.

In some aspects, whether the translation table is updated in the push mode is determined during the machine learning operation based on a characteristic of the task.

In some aspects, the characteristic of the task comprises a type of a layer associated with the task.

In some aspects, wherein the type of the layer associated with the task represents whether the task is associated with a next layer of a current layer of the machine learning model, the current layer corresponding to a layer for which the processing circuitry is processing. Determining whether the translation table is updated in the push mode comprises: determining whether the task is associated with the next layer of the current layer of the machine learning model; and determining that the translation table is updated in the push mode, when the task is for the next layer.

In some aspects, the type of the layer associated with the task represents whether the task is associated with a front layer of the machine learning model. Determining whether the translation table is updated in the push mode comprises: determining whether the task is associated with the front layer of the machine learning model; and determining that the translation table is updated in the push mode, when the task is for the front layer.

In some aspects, the characteristic of the task comprises a number of query streams of the machine learning operation associated with the task.

In some aspects, determining whether the translation table is updated in the push mode comprises: determine whether the number of query streams is equal to 1; and determining that the translation table is updated in the push mode, when the task is equal to 1.

In some aspects, the characteristic of the task comprises a type of a memory accessed by the task.

In some aspects, the type of the memory accessed by the task represents whether the task accesses a memory located within the processing circuitry. Determining whether the translation table is updated in the push mode comprises: determine whether the task accesses the memory located within the processing circuitry; and determining that the translation table is updated in the push mode, when the task accesses a memory located within the processing circuitry.

In some aspects, the type of the memory accessed by the task represents whether the task accesses a memory located outside the processing device. Determining whether the translation table is updated in the push mode comprises: determine whether the task accesses the memory located outside the processing device; and determining that the translation table is updated in the push mode, when the task accesses a memory located outside the processing device.

In some aspects, the type of the memory accessed by the task represents whether the task accesses a read-only sharable memory region which is shared by a plurality of processors. Determining whether the translation table is updated in the push mode comprises: determine whether the task accesses the read-only sharable memory region; and determining that the translation table is updated in the push mode, when the task accesses the read-only sharable memory region.

In some aspects, the type of the memory accessed by the task represents whether the task accesses a memory region for backing up a register file. Determining whether the translation table is updated in the push mode comprises: determine whether the task accesses the memory region for backing up a register file or a memory region for register spilling; and determining that the translation table is updated in the push mode, when the task accesses the memory region for backing up a register file.

In some aspects, the type of the memory accessed by the task represents whether the task accesses a memory region for register spilling. Determining whether the translation table is updated in the push mode comprises: determine whether the task accesses the memory region for register spilling; and determining that the translation table is updated in the push mode, when the task accesses the memory region for register spilling.

In some aspects, the type of the memory accessed by the task represents whether the task accesses a memory region whose size is less than a threshold size and whose access frequency is greater than a threshold frequency. Determining whether the translation table is updated in the push mode comprises: determine whether the task accesses the memory region whose size is less than the threshold size and whose access frequency is greater than the threshold frequency; and determining that the translation table is updated in the push mode, when the task accesses the memory region whose size is less than the threshold size and whose access frequency is greater than the threshold frequency.

In some aspects, the type of the memory accessed by the task represents whether the task accesses a memory region storing a memory mapped file. Determining whether the translation table is updated in the push mode comprises: determine whether the task accesses the memory region storing a memory mapped file; and determining that the translation table is updated in the push mode, when the task accesses the memory region storing a memory mapped file.

In some aspects, determining whether the translation table is updated in the push mode comprises: determine whether a quality of service (QOS) level for the machine learning operation associated with the task is higher than a threshold QoS; and determining that the translation table is updated in the push mode, when the QoS level is higher than a threshold QoS.

In some aspects, generating the task for the machine learning model comprises: receiving a command descriptor for the machine learning model; and generating the task to be assigned to the processing circuitry based on the received command descriptor.

In some aspects, a method performed by a processing device including circuitry, comprises: generating a task for a machine learning operation of a machine learning model to be assigned to processing circuitry; determining, based on a characteristic of the task, whether a translation table is updated in a push mode for a translation memory of the processing circuitry, wherein the translation table specifies relationship between virtual memory addresses and physical memory addresses; in response to a determination that the translation table is updated in the push mode, pushing the translation table into the translation memory of the processing circuitry before assigning the task to the processing circuitry; in response to a determination that the translation table is not updated in the push mode, assigning the task to the processing circuitry without pushing the translation table into the translation memory of the processing circuitry; processing the task based on the translation table in the translation memory to generate an output; and processing the machine learning operation of the machine learning model based on the output from the plurality of the processing circuitry.

In some aspects, the translation table is updated in the push mode is determined during the machine learning operation based on a characteristic of the task.

In some aspects, the characteristic of the task comprises at least one of a type of a layer associated with the task, a number of query streams of the machine learning operation associated with the task, or a type of a memory accessed by the task.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A processing device configured to cause:
   generating a task for a machine learning operation of a machine learning model to be assigned to processing circuitry;
   determining, based on a characteristic of the task, whether a translation table is updated in a push mode for a translation memory of the processing circuitry, wherein the translation table specifies relationship between virtual memory addresses and physical memory addresses;
   in response to a determination that the translation table is updated in the push mode, pushing an update signal comprising update information to the translation table into the translation memory of the processing circuitry before assigning the task to the processing circuitry and updating the translation table using the update information; and
   in response to a determination that the translation table is not updated in the push mode, assigning the task to the processing circuitry without pushing the update signal comprising the update information to the translation table into the translation memory of the processing circuitry,
   wherein the processing circuitry is configured to process the task based on the translation table in the translation memory to generate an output,
   the processing device processes the machine learning operation of the machine learning model based on the output from the processing circuitry.

2. The processing device of claim 1, wherein
   whether the translation table is updated in the push mode is determined during the machine learning operation based on a characteristic of the task.

3. The processing device of claim 2, wherein the characteristic of the task comprises a type of a layer associated with the task.

4. The processing device of claim 3, wherein the type of the layer associated with the task represents whether the task is associated with a next layer of a current layer of the machine learning model, the current layer corresponding to a layer for which the processing circuitry is processing, and
   wherein determining whether the translation table is updated in the push mode comprises:
   determining whether the task is associated with the next layer of the current layer of the machine learning model; and
   determining that the translation table is updated in the push mode, when the task is for the next layer.

5. The processing device of claim 3, wherein the type of the layer associated with the task represents whether the task is associated with a front layer of the machine learning model, and
   wherein determining whether the translation table is updated in the push mode comprises:
   determining whether the task is associated with the front layer of the machine learning model; and
   determining that the translation table is updated in the push mode, when the task is for the front layer.

6. The processing device of claim 2, wherein the characteristic of the task comprises a number of query streams of the machine learning operation associated with the task.

7. The processing device of claim 6, wherein determining whether the translation table is updated in the push mode comprises:
   determine whether the number of query streams is equal to 1; and
   determining that the translation table is updated in the push mode, when the task is equal to 1.

8. The processing device of claim 2, wherein the characteristic of the task comprises a type of a memory accessed by the task.

9. The processing device of claim 8, wherein the type of the memory accessed by the task represents whether the task accesses a memory located within the processing circuitry, and
   wherein determining whether the translation table is updated in the push mode comprises:
   determine whether the task accesses the memory located within the processing circuitry; and
   determining that the translation table is updated in the push mode, when the task accesses a memory located within the processing circuitry.

10. The processing device of claim 8, wherein the type of the memory accessed by the task represents whether the task accesses a memory located outside the processing device, and
    wherein determining whether the translation table is updated in the push mode comprises:
    determine whether the task accesses the memory located outside the processing device; and
    determining that the translation table is updated in the push mode, when the task accesses a memory located outside the processing device.

11. The processing device of claim 8, wherein the type of the memory accessed by the task represents whether the task accesses a read-only sharable memory region which is shared by a plurality of processors, and
wherein determining whether the translation table is updated in the push mode comprises:
determine whether the task accesses the read-only sharable memory region; and
determining that the translation table is updated in the push mode, when the task accesses the read-only sharable memory region.

12. The processing device of claim 8, wherein the type of the memory accessed by the task represents whether the task accesses a memory region for backing up a register file, and
wherein determining whether the translation table is updated in the push mode comprises:
determine whether the task accesses the memory region for backing up a register file or a memory region for register spilling; and
determining that the translation table is updated in the push mode, when the task accesses the memory region for backing up a register file.

13. The processing device of claim 8, wherein the type of the memory accessed by the task represents whether the task accesses a memory region for register spilling, and
wherein determining whether the translation table is updated in the push mode comprises:
determine whether the task accesses the memory region for register spilling; and
determining that the translation table is updated in the push mode, when the task accesses the memory region for register spilling.

14. The processing device of claim 8, wherein the type of the memory accessed by the task represents whether the task accesses a memory region whose size is less than a threshold size and whose access frequency is greater than a threshold frequency, and
wherein determining whether the translation table is updated in the push mode comprises:
determine whether the task accesses the memory region whose size is less than the threshold size and whose access frequency is greater than the threshold frequency; and
determining that the translation table is updated in the push mode, when the task accesses the memory region whose size is less than the threshold size and whose access frequency is greater than the threshold frequency.

15. The processing device of claim 8, wherein the type of the memory accessed by the task represents whether the task accesses a memory region storing a memory mapped file, and
wherein determining whether the translation table is updated in the push mode comprises:
determine whether the task accesses the memory region storing a memory mapped file; and
determining that the translation table is updated in the push mode, when the task accesses the memory region storing a memory mapped file.

16. The processing device of claim 2, wherein determining whether the translation table is updated in the push mode comprises:
determine whether a quality of service (QOS) level for the machine learning operation associated with the task is higher than a threshold QoS; and
determining that the translation table is updated in the push mode, when the QoS level is higher than a threshold QoS.

17. The processing device of claim 1, wherein generating the task for the machine learning model comprises:
receiving a command descriptor for the machine learning model; and
generating the task to be assigned to the processing circuitry based on the received command descriptor.

18. A method performed by a processing device including processing circuitry, comprising:
generating a task for a machine learning operation of a machine learning model to be assigned to processing circuitry;
determining, based on a characteristic of the task, whether a translation table is updated in a push mode for a translation memory of the processing circuitry, wherein the translation table specifies relationship between virtual memory addresses and physical memory addresses;
in response to a determination that the translation table is updated in the push mode, pushing an update signal comprising update information to the translation table into the translation memory of the processing circuitry before assigning the task to the processing circuitry and updating the translation table using the update information;
in response to a determination that the translation table is not updated in the push mode, assigning the task to the processing circuitry without pushing the update signal comprising the update information to the translation table into the translation memory of the processing circuitry;
processing the task based on the translation table in the translation memory to generate an output; and
processing the machine learning operation of the machine learning model based on the output from the processing circuitry.

19. The method of claim 18, wherein
whether the translation table is updated in the push mode is determined during the machine learning operation based on a characteristic of the task.

20. The method of claim 19, wherein the characteristic of the task comprises at least one of a type of a layer associated with the task, a number of query streams of the machine learning operation associated with the task, or a type of a memory accessed by the task.

21. A processing device configured to cause:
generating a task for a machine learning operation of a machine learning model to be assigned to processing circuitry;
determining, based on a number of query streams of the machine learning operation associated with the task, whether a translation table is updated in a push mode for a translation memory of the processing circuitry, wherein the translation table specifies relationship between virtual memory addresses and physical memory addresses;
in response to a determination that the translation table is updated in the push mode, pushing an update signal comprising update information to the translation table into the translation memory of the processing circuitry before assigning the task to the processing circuitry and updating the translation table using the update information; and
in response to a determination that the translation table is not updated in the push mode, assigning the task to the processing circuitry without pushing the update signal comprising the update information to the translation table into the translation memory of the processing circuitry, wherein the processing circuitry is configured to process the task based on the translation table in the translation memory to generate an output, the processing device processes the machine learning operation of the machine learning model based on the output from the processing circuitry.

* * * * *